United States Patent
Suganuma et al.

(10) Patent No.: US 7,368,881 B2
(45) Date of Patent: May 6, 2008

(54) DISCHARGE LAMP LIGHTING APPARATUS AND LAMP SYSTEM USING THE LIGHTING APPARATUS

(75) Inventors: Kazutoshi Suganuma, Toyonaka (JP); Takashi Kanbara, Ikeda (JP); Toshifumi Tanaka, Katano (JP)

(73) Assignee: Matsushita Electric Works, Ltd., Osaka (JP)

( * ) Notice: Subject to any disclaimer, the term of this patent is extended or adjusted under 35 U.S.C. 154(b) by 134 days.

(21) Appl. No.: 10/596,794

(22) PCT Filed: Dec. 22, 2004

(86) PCT No.: PCT/JP2004/019697

§ 371 (c)(1), (2), (4) Date: Jun. 23, 2006

(87) PCT Pub. No.: WO2005/064997

PCT Pub. Date: Jul. 14, 2005

(65) Prior Publication Data

US 2007/0138975 A1    Jun. 21, 2007

(30) Foreign Application Priority Data

Dec. 26, 2003  (JP)  ............. 2003-433532

(51) Int. Cl.
H05B 37/02  (2006.01)
(52) U.S. Cl. ............. 315/291; 315/209 R; 315/308
(58) Field of Classification Search ............. 315/209 R, 315/224, 225, 287, 291, 302, 307–309, 360
See application file for complete search history.

(56) References Cited

U.S. PATENT DOCUMENTS 5,481,163 A   1/1996  Nakamura et al. .......... 315/308
6,066,921 A   5/2000  Nakamura et al. .......... 315/71
6,127,789 A * 10/2000 Ishizuka et al. ............ 315/308

(Continued)

FOREIGN PATENT DOCUMENTS

EP   1351276   10/2003

(Continued)

OTHER PUBLICATIONS

English language Abstract of JP 9-073991.

(Continued)

*Primary Examiner*—Thuy V. Tran
*Assistant Examiner*—Jimmy T Vu
(74) *Attorney, Agent, or Firm*—Greenblum & Bernstein, P.L.C.

(57) ABSTRACT

In a discharge lamp lighting apparatus, a power supplied to a discharge lamp La through a DC-DC converter 1 and an inverter 2 is controlled depending on detection results of a lamp voltage detection unit 6 and a lamp current detection unit 7, and in an electrode heating period an alternation time of an output to the discharge lamp when starting actuation of the discharge lamp is set longer than an alternation time in a steady lighting period, and the alternation time in the electrode heating period is increased depending on lowering of a supply power or current to the discharge lamp. Thus, even when a lamp current is suddenly changed, the discharge lamp is prevented from going off at the time of polarity inversion without lowering a life.

24 Claims, 28 Drawing Sheets

U.S. PATENT DOCUMENTS

| | | |
|---|---|---|
| 6,291,945 B1 | 9/2001 | Toyama et al. ............. 315/307 |
| 6,621,237 B2 * | 9/2003 | Urakabe et al. ............ 315/276 |
| 6,686,704 B2 * | 2/2004 | Suzuki ....................... 315/274 |
| 6,963,176 B2 | 11/2005 | Onishi et al. ............... 315/291 |
| 2003/0111969 A1 | 6/2003 | Konishi et al. ............. 315/291 |
| 2003/0160576 A1 | 8/2003 | Suzuki ....................... 315/291 |
| 2003/0189408 A1 | 10/2003 | Lapatovich et al. ........ 313/637 |
| 2006/0055341 A1 | 3/2006 | Watanabe et al. .......... 315/291 |

FOREIGN PATENT DOCUMENTS

| | | |
|---|---|---|
| JP | 9-073991 | 3/1997 |
| JP | 2002-216982 | 8/2002 |

OTHER PUBLICATIONS

English language Abstract of JP 2002-216982.

* cited by examiner

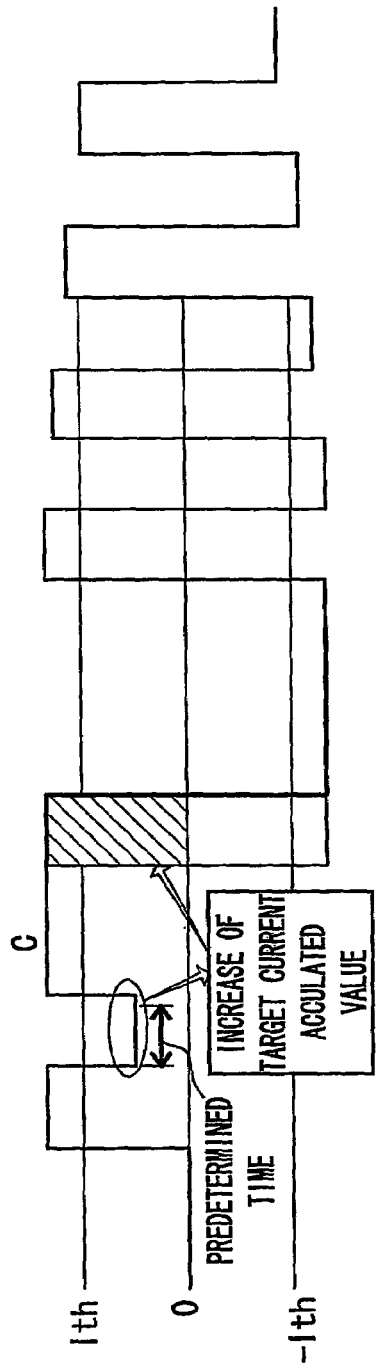
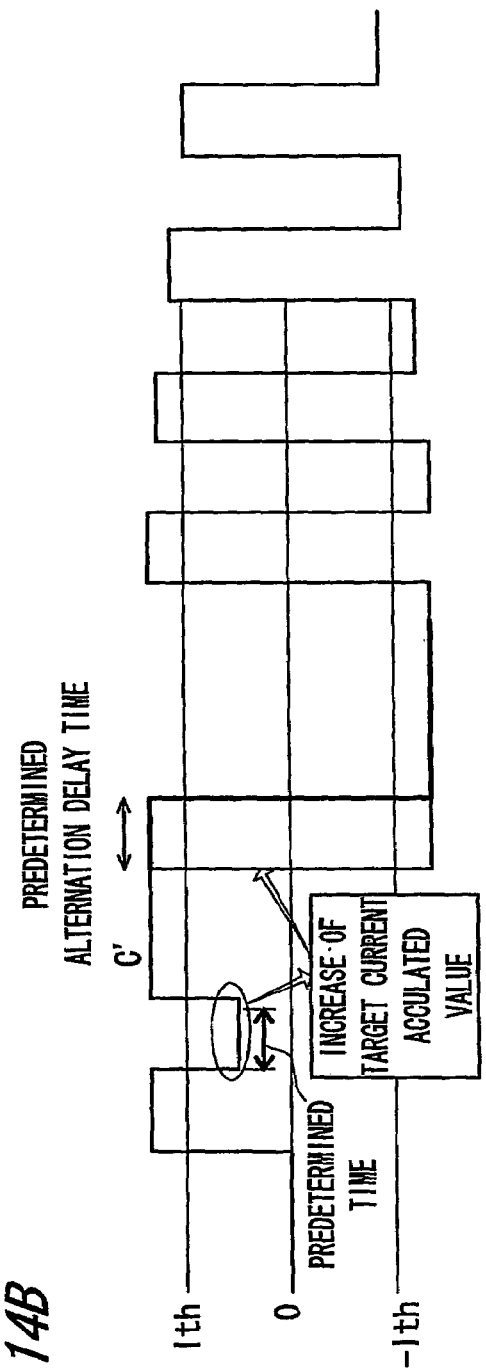

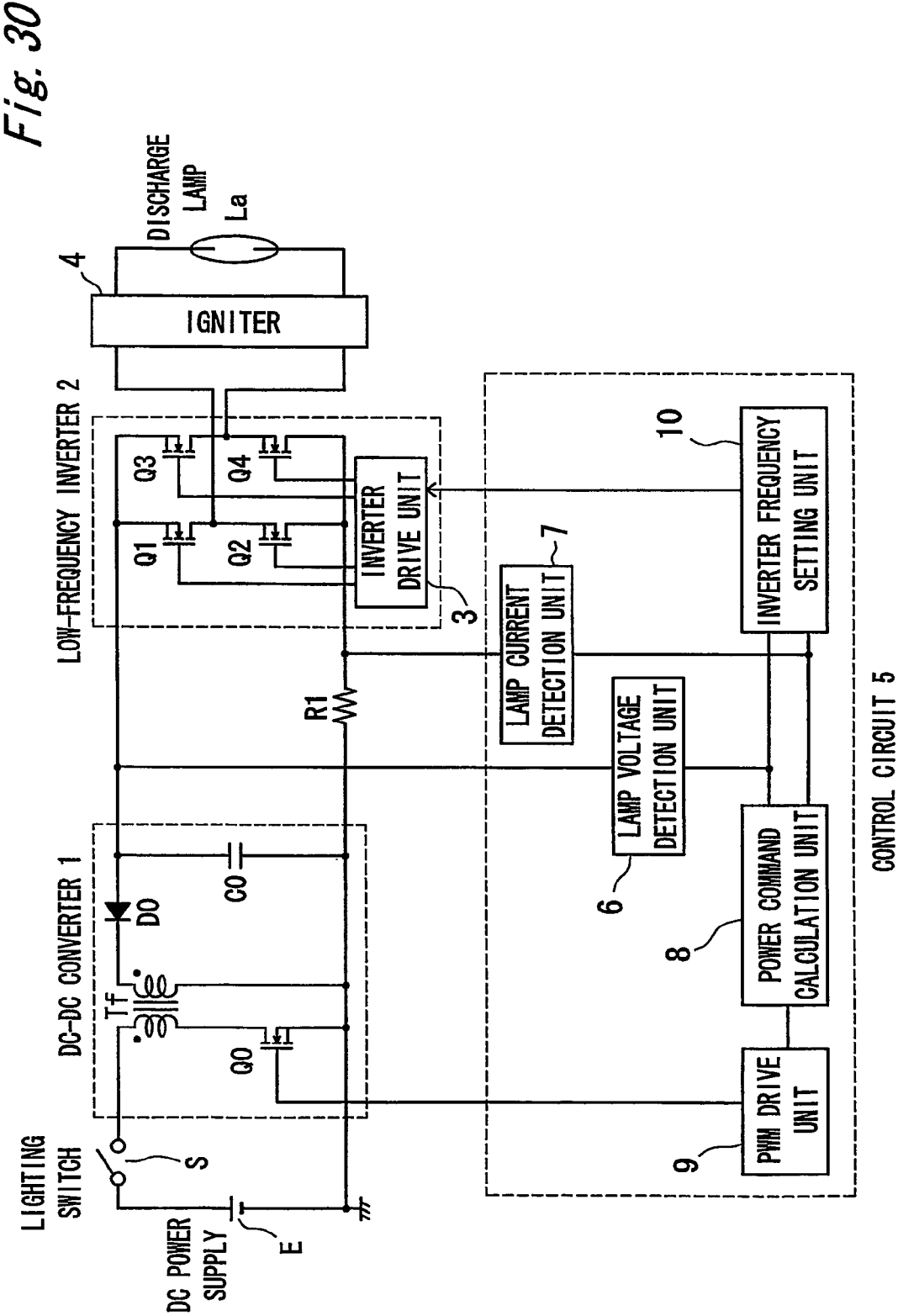

DISCHARGE LAMP LIGHTING APPARATUS AND LAMP SYSTEM USING THE LIGHTING APPARATUS

TECHNICAL FIELD

The present invention relates to an apparatus for lighting a high-voltage discharge lamp such as a metal halide lamp, and more particularly, to a discharge lamp lighting apparatus which is needed when a car headlight and the like is instantaneously lightened, and also relates to a lamp system using the lighting apparatus.

BACKGROUND ART

FIG. 30 shows a conventional example 1 of a lighting apparatus disclosed in Document 1 (Japanese Patent Unexamined Laid-open Publication No. 9-73991). The conventional example 1 of the lighting apparatus comprises a DC power supply E, a lighting switch S, a DC-DC converter 1, a low-frequency inverter 2, an igniter 4, a discharge lamp La, and a control circuit 5. The control circuit 5 controls an output power so as to be a set value by detecting an output voltage and an output current of the DC-DC converter 1 as a lamp voltage and a lamp current of the discharge lamp La, calculating a lamp power from the detection results, and driving a switching element Q0 via a PWM drive unit 9 using an output power command value obtained based on the calculation result.

As shown in FIGS. 31A and 31B, when the discharge lamp La is actuated to be turned on, there is provided a period for inverting an output polarity of an inverter 2 (referred to as "electrode heating period", hereinafter) at a frequency fd i.e., long inversion cycle) lower than an inversion frequency ft which is used at the time of a normal operation. The inversion frequency is set by an inversion frequency setting unit 10.

When the discharge lamp La is actuated to be turned on, if an OFF period before the discharge lamp is turned on is relatively long and an electrode temperature of the lamp is low, a lamp current detection value for the electrode heating period is great. Meanwhile, if the OFF period before the discharge lamp is turned on is short, since the electrode temperature at the time of start of lighting is higher as the OFF period is shorter, the lamp current detection value for the electrode heating period is small.

Thus, there is provided a control unit for varying an inversion cycle for the electrode heating period depending on the lamp current detection value. Thus, since the inversion cycle for the electrode heating period is increased as the lamp current detection value is smaller, the discharge lamp can be turned on in a state in which the electrode of the discharge lamp is sufficiently heated up. As a result, the discharge lamp is prevented from going off when the output polarity is inverted in the inverter circuit, so that the discharge lamp can be surely moved to a stable lighting state. In addition, according to the conventional example 1, the set value of the inversion cycle is varied only depending on the lamp current detection value or a lamp current accumulated value.

According to a conventional example 2 disclosed in Japanese Patent Unexamined Laid-open Publication No. 2002-216982), a discharge lamp is prevented from going off by adjusting an inversion cycle for an electrode heating period, without using a lamp current detection value or a lamp current accumulated value as shown in the conventional example 1. In this conventional example 2, an accumulated value of a lamp voltage detection value, an inverse number of the lamp voltage detection value, a lamp current command value and an accumulated value of the lamp current command value are used for adjusting an inversion cycle.

Since the lamp current just after the discharge lamp is turned on is greatly fluctuated, there may be a case that the current value is not accurately detected in the conventional example 1. Thus, as means for solving the above problem, there is suggested a control in the conventional example 2 as described below. That is, in order to provide a stable lighting operation, there is set an open loop control period in which a switching element for controlling a power of the DC-DC converter is driven at a given frequency or on duty. Then, a lamp voltage and a lamp current for the open loop control period are used as initial values of the lamp voltage and the lamp current detection values at the time of the start of the electrode heating period. Thus, an accurate and stable adjustment for the inversion cycle can be achieved for the electrode heating period.

In this conventional example 2, the set value of the electrode heating period is varied only depending on the accumulated value of the lamp voltage detection value, the inverse number of the lamp voltage detection value, the lamp current command value and the accumulated value of the lamp current command value.

DISCLOSURE OF INVENTION

In the conventional examples described above, the inversion cycle for the predetermined electrode heating period is determined only by a state of the discharge lamp such as the accumulated value of the lamp current detection value, the lamp current accumulated value, the lamp voltage detection value, the inverse number of the lamp voltage detection value, the lamp current command value and the accumulated value of the lamp current command value.

A description will be made of an example using the lamp current detection value as a state of the discharge lamp. As shown in FIG. 31C, when an OFF period before a discharge lamp is turned on is long and an electrode temperature is low, since a lamp current value Ia for an electrode heating period is great, an inversion cycle ta for the electrode heating period is set to be short. When the OFF period before the discharge lamp is turned on is short and an electrode temperature is high, since a lamp current value Ib for the electrode heating period is small, an inversion cycle tb for the electrode heating period is set to be long.

Here, as a method of surely turning on the discharge lamp, there is a method in which the lamp current is set higher and the inversion cycle for the electrode heating period is set long as much as possible. However, in that method, stress to the discharge lamp and the lighting apparatus is increased, causing the life of the discharge lamp to be shortened and the size of the lighting apparatus to be large. Therefore, it is necessary to set the electrode heating period such that the stress to the discharge lamp and the lighting apparatus can be reduced to a minimum and the discharge lamp is surely prevented from going off.

In an actual lighting apparatus, when an input voltage from a DC power supply E is lowered, or when a circumferential temperature of the lighting apparatus rises, in order to prevent increase of stress of a component and circuit loss, there is provided a control portion (not shown) in which a power amount applied to the discharge lamp at the start of lighting the lamp is intentionally lowered regardless of a state of the discharge lamp in some cases.

Here, a description will be made of a case where the conventional example is applied to the lighting apparatus including the above control method. When it is assumed that an inversion cycle for an electrode heating period is ta when an output current for the electrode heating period is Ia (OFF period before lighting: A), and an inversion cycle for the electrode heating period is tb when an output current for the electrode heating period is Ib (OFF period before lighting: B), the condition is such that Ia>Ib, A>B and ta<tb.

Here, it is assumed that, when the discharge lamp is actuated to be turned on in the state that the OFF period before lighting is A, the input voltage from the DC power supply E is lowered and the output power is intentionally lowered for the above reasons so that the output current is lowered from Ia to Ib, the inversion cycle for the electrode heating period is set to be tb in the control of the conventional example. However, the inversion cycle tb is a value which is set assuming the state of the discharge lamp in which the OFF period before lighting is B. Therefore, there is a mismatch between the state of the discharge lamp and the control.

In addition, when the OFF period before lighting is A and the output current is lowered from Ia to Ib, it is known that if the inversion cycle for the electrode heating period is not set further longer (at least tb or more in this case), the discharge lamp will go off. This phenomenon is apparently generated in a region in which the output current is relatively small. The same is true of all of the conventional examples in which the inversion cycle for the electrode heating period is set depending on the state of the discharge lamp.

For the above reasons, when it is assumed that the output power for the electrode heating period is lowered because of fluctuation of the input voltage from the DC power supply E or fluctuation of the circumferential temperature of the lighting apparatus and the like, there is a problem such that the discharge lamp goes off depending on a lowering amount of the output power in the control of the conventional example.

Furthermore, it is considered that when the discharge lamp is actuated to be turned on, its voltage and current characteristics are unstable and the output of the DC-DC converter may be abruptly varied. Therefore, if the electrode heating period which is set only by the state of the discharge lamp depending on the length of the OFF period before lighting is applied to the discharge lamp, there may be a problem in some cases that the discharge lamp goes off when the output polarity is inverted by the inverter.

The present invention was made in view of the above problems and it is an object of the present invention to provide an improvement of a discharge lamp lighting apparatus, preventing a discharge lamp from going off when the output polarity is inverted by the inverter, without shortening the life of the discharge lamp, so that the discharge lamp can be surely moved to the stable lighting state even when the lamp current is abruptly changed or lowered when the discharge lamp is actuated to be turned on because of the changes of the power supply circumference, the operation circumference of the lighting apparatus, or the change in electrical characteristics of the discharge lamp and the like.

According to the present invention, in order to solve the above problems, a discharge lamp lighting apparatus includes: a power conversion unit for converting a DC power supply voltage to a desired voltage; an inverter for inverting a polarity of an output from the power conversion unit and supplying an alternating output to a discharge lamp load; a lamp voltage detection unit for detecting a voltage value corresponding to a tube voltage of the discharge lamp; a lamp current detection unit for detecting a current value corresponding to a tube current of the discharge lamp; and a control unit for controlling an output of the inverter to be supplied to the discharge lamp depending on the detection results of the lamp voltage and lamp current detection units.

In this arrangement, the control unit includes electrode heating amount setting means which sets an alternation time of the output power to be supplied to the discharge lamp in an electrode heating period for actuation of the discharge lamp to be longer than an alternation time thereof in a steady lighting period thereof, and which increases the alternation time in the electrode heating period depending on a lowering degree of a lamp power or a lamp current supplied to the discharge lamp.

According to the present invention, the discharge lamp is prevented from going off when the polarity is inverted by the inverter without shortening the life of the discharge lamp so that the discharge lamp can be surely moved to the stable lighting state even when the lamp current is abruptly changed when the discharge lamp is turned on because of the changes of the power supply circumference, the operation circumference of the lighting apparatus, or the change in electrical characteristics of the discharge lamp and the like.

BRIEF DESCRIPTION OF DRAWINGS

FIGS. 14A and 14B are views for explaining operations according to the embodiment 8 of the present invention.

FIG. 30 is a circuit diagram according to a conventional example.

BEST MODE FOR CARRYING OUT THE INVENTION

Embodiment 1

Figure 1:
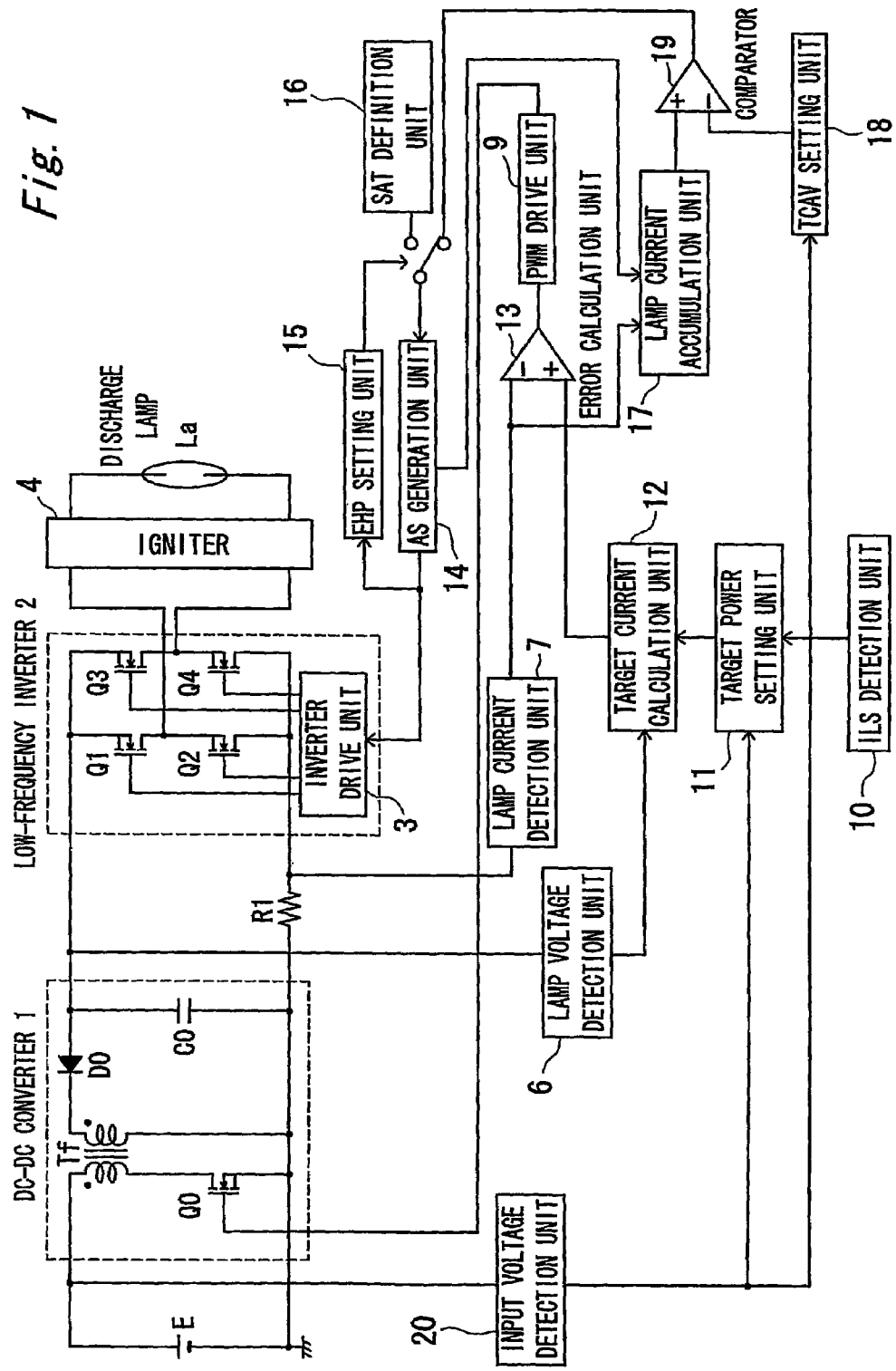
FIG. 1 is a circuit diagram according to an embodiment 1 of the present invention.

FIG. 1 is a circuit diagram showing an embodiment 1 of a discharge lamp lighting apparatus according to the present invention. In FIG. 1, reference character E designates a DC power supply which is a car battery (14V, for example) and the like. However, a commercial AC power supply may be used under the condition of being rectified and smoothed.

Reference numeral 1 designates a DC-DC converter, which constitutes a power conversion unit in a first aspect of the present invention. Although an FET is illustrated as a switching element Q0, other type of a switching element, for example, IGBT may be also used therefor. The DC power is converted through a transformer Tf by turning on/off the switching element Q0. Although a flyback type is illustrated as a circuit mode, it may be another type. An output of the transformer Tf is rectified by a diode DO and the smoothed DC voltage is obtained by a capacitor C0. In addition, according to the illustrated circuit, although a negative potential output type having a potential of the output to be negative to the ground is illustrated, it may be a positive potential output type.

Reference numeral 2 designates a low-frequency inverter which constitutes an inverter in the first aspect of the present invention. The low-frequency inverter 2 alternates the DC voltage output from the DC-DC converter 1 at a low frequency and supplies to a load side. In the low-frequency inverter 2, a series circuit of the switching elements Q1 and Q2 and a series circuit of switching elements Q3 and Q4 are connected in parallel, and they are alternately turned on/off by an inverter drive unit 3 in a manner of a cross-coupled combination. That is, a period is set such that the switching elements Q1 and Q4 are ON and the switching elements Q2 and Q3 are OFF, and a subsequent period is set such that the switching elements Q1 and Q4 are OFF and the switching elements Q2 and Q3 are ON, and these periods are alternated at the low frequency. A signal to notify the timing of the alternation is input to the inverter drive unit 3 from an alternation signal generation unit (which will be described later).

Reference character La designates the discharge lamp which is a metal halide lamp used as a car headlight and the like. The type of the discharge lamp may be not only a mercury type which is commercially produced at present but also a non-mercury type of a high-voltage metal halide lamp for a car headlight, which is currently developed.

Reference numeral 4 designates an igniter which receives the output voltage from the low-frequency inverter 2 and generates a high-voltage pulse (20 kV0-p or more, for example) to be applied to the discharge lamp La in a period i.e., no-load period) before the discharge lamp La is actuated to be turned on. When the high-voltage pulse is applied, dielectric breakdown of the discharge lamp La is done so that the lamp is actuated to be turned on. Although the power supply for the igniter 4 is provided from the output of the low-frequency inverter 2 here, the power supply may be applied from other than that. For example, a tertiary winding is provided in the transformer Tf of the DC-DC converter 1 and its output may be rectified and smoothed to be used as the power supply for the igniter 4.

Reference numeral 6 designates a lamp voltage detection unit which detects a voltage value corresponding to a lamp (discharge lamp) voltage. In the illustrated circuit, the value corresponding to the lamp voltage is detected by detecting the output voltage of the DC-DC converter 1. However, another detection method may be used. In addition, according to this embodiment, since the lamp voltage detection unit 6 is of a negative potential detection type, it comprises an inversion amplification circuit and the like (not shown).

Reference numeral 7 designates a lamp current detection unit which detects a current value corresponding to a lamp (discharge lamp) current. According to the illustrated circuit, an output current of the DC-DC converter 1 is detected as the value corresponding to the lamp current value via a resistance R1 for detection. However, another detection method may be used. In addition, according to this embodiment, since the lamp current detection unit 7 is of a negative potential detection type, it comprises an inversion amplification circuit and the like (not shown).

Reference numeral 10 designates an initial lamp state detection unit (designated as "ILS DETECTION UNIT" in the drawings) which outputs a value indicative of an arc tube temperature of the discharge lamp in the no-load period when and before the discharge lamp is actuated. For example, it may be an initial lamp state simulated detection circuit which is a time constant circuit comprising a resistance and a capacitor. The capacitor (not shown) is charged at a first time constant after the lamp is actuated, and the capacitor is discharged at a second time constant when the lamp is turned off. The voltage of the capacitor when and before the lamp is actuated is output as that of an initial lamp state. In a case of a so-called cold start state after the discharge lamp is OFF for a long period, a small value (or zero) of the voltage of the capacitor is output, and in a case of a so-called hot restart state just after a light-on state is turned off, as its light-off period is shorter, a larger value is output from the initial lamp state detection unit 10.

Figure 2:
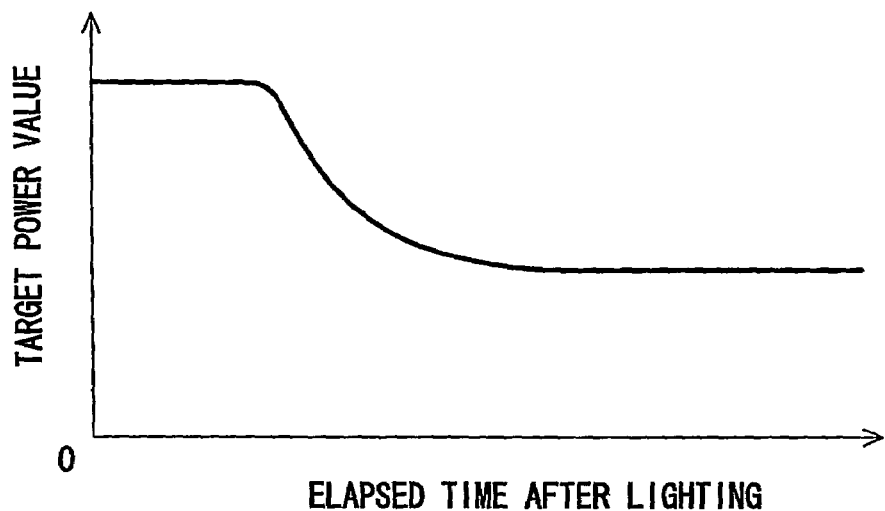
FIG. 2 is an explanatory view showing time variation of a target power according to the embodiment 1 of the present invention.

Reference numeral 11 designates a target power setting unit which sets a target power to be supplied to the discharge lamp. In a case where it is necessary to start the lamp actuation in a short time after the discharge lamp is actuated such as a case of a car headlight, the target power is set such that a high power higher than a rated power (two times or more, for example) is supplied to the discharge lamp for several seconds after the actuation. Then, the power supplied to the discharge lamp gradually approximates to the rated power (35W, for example). In addition, the target power is set depending on the lamp state output from the initial lamp state detection unit 10 such that, in the case of the cold start, a high power is supplied at the time of starting the lamp actuation, and in the case of the hot restart, the supply power at the time of starting the lamp actuation more closely approximates to the rated power as the light-off period is shorter. For example, as shown in FIG. 2, the target power value is set depending on an elapsed time after the start of the lamp actuation, and the target power value is not set at the elapsed time 0 but set in a middle of the elapsed time in the case of the hot restart operation.

Reference numeral 12 designates a target current calculation unit which calculates and outputs a target current based on the outputs from the target power setting unit 11 and the lamp voltage detection unit 6. Basically, the output from the target current calculation unit 12 is obtained as a value provided by dividing the output value from the target power setting unit 11 by the output value from the lamp voltage detection unit 6.

Reference numeral 13 designates an error calculation unit, reference numeral 9 designates a PWM drive unit. An output value from the lamp current detection unit 7 is compared (error calculation) with an output value of the target current calculation unit 12 in the error calculation unit 13, and the PWM drive unit 9 drives the switching element Q0 of the DC-DC converter 1 according to the error calculation result. An output corresponding to the output value of the target current calculation unit 12 is supplied to the discharge lamp La by adjusting the on-duty of the switching operation of the switching element Q0. However, the control method of the output to be supplied to the lamp may be a method other than the PWM control.

Reference numeral 14 designates an alternation signal generation unit (designated as "AS GENERATION UNIT" in the drawings) which outputs an alternation timing signal to the inverter drive unit 3 to notify the timing of alternating an output polarity in the low-frequency inverter 2.

Reference numeral 15 designates an electrode heating period setting unit (designated as "EHP SETTING UNIT" in the drawings) which counts the number of the output times of the alternation signal generation unit 14. When the output polarity is alternated predetermined number of times (which the predetermined number of times is determined by the electrode heating period setting unit 15) after the start of the discharge lamp actuation, the electrode heating period setting unit 15 switches the signal input connection of the alternation signal generation unit 14 from a comparator 19 (to be described later) to a steady alternation time definition unit 16.

Reference numeral 16 designates the steady alternation time definition unit (designated as "SAT DEFINITION UNIT" in the drawings) which defines an output alternation time after the electrode heating period. Thus, a lighting frequency of rectangular-wave lighting of the discharge lamp is determined. For example, the steady alternation time is set so that the lighting frequency may become about 400 Hz.

Reference numeral 17 designates a lamp current accumulation unit which accumulates the outputs of the lamp current detection unit 7 with respect to a time lapse.

Reference numeral 18 designates a target current accumulated value setting unit (designated as "TCAVSETTING UNIT" in the drawings) which sets and outputs a target value of a current accumulated value of a lamp current (which is an output of the lamp current detection unit 7 in this example) until the alternation to determine the alternation timing in the electrode heating period after the start of the discharge lamp actuation.

Reference numeral 19 designates a comparator which compares an output of the lamp current detection unit 17 with an output of the target current accumulated value setting unit 18. When the output of the lamp current detection unit 17 exceeds the output of the target current accumulated value setting unit 18, the comparator outputs a timing signal to notify the timing of the alternation to the alternation signal generation unit 14. In the electrode heating period, the alternation signal generation unit 14 receives the alternation timing signal and outputs the alternation command signal to the inverter drive unit 3 so that the output polarity is alternated in the inverter 2. At this time, the accumulated value of the lamp current accumulation unit 17 is reset by the signal from the alternation signal generation unit 14 and the same operations are continuously repeated thereafter.

Figure 3:
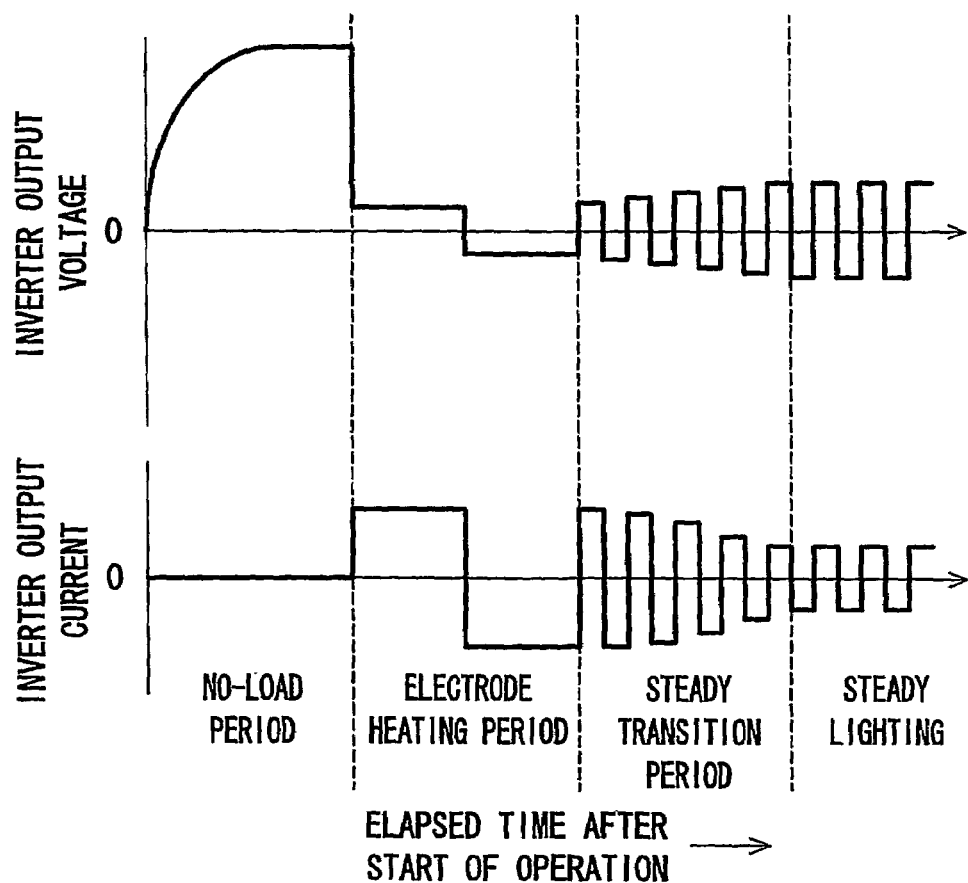
FIG. 3 is a waveform chart showing an output voltage and an output current according to the embodiment 1 of the present invention.

Through the above operations, an alternated voltage and an alternated current outputted of the inverter after the start of the discharge lamp actuation are obtained as shown in FIG. 3. In this example, the number of alternations of the output polarity in the electrode heating period is set at two in the illustrated embodiment, and an accumulated current value corresponds to an area of a current in a half cycle in the figure, and the accumulated value of the current with respect to a time lapse at each polarity in the electrode heating period becomes a target current accumulated value determined by the target current accumulated value setting unit 18.

Meanwhile, the output voltage of the inverter 2 is controlled so as to be maintained constant in a no-load period before the start of the discharge lamp actuation. More specifically, the output voltage (no-load voltage) of the inerter 2 before the discharge lamp actuation is controlled so as to be maintained at a predetermined voltage level by comparing the output of the lamp voltage detection unit 6 with a predetermined value in a comparator (not shown). When the output value of the lamp voltage detection unit 6 exceeds the predetermined value, the output signal from the PWM drive unit 9 is shut down or set to approximately equal to zero. Thus, in a lighting apparatus for a car headlight, the no-load voltage output of the inverter is set at about 400V, for example.

Reference numeral 20 designates an input voltage detection unit which detects a voltage input to the DC-DC converter 1 from the power supply E, which constitutes to a power supply voltage detection unit defined in the aspect of claim 4.

Figure 4A:
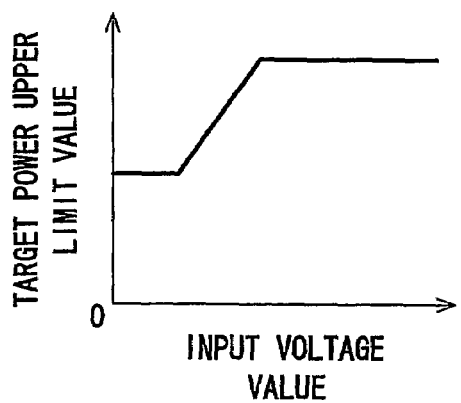
FIGS. 4A, 4B, 4C and 4D are views for explaining operations according to the embodiment 1 of the present invention.
Figure 4B:
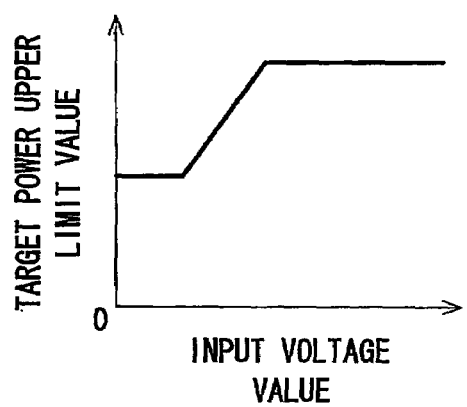

The target power setting unit 11 receives an output of the input voltage detection unit 20 and sets an upper limit value in setting the target power, and when the input voltage is lowered, the target power setting unit 11 limits the output power so as not to set the target value greater than the upper limit value, as shown in FIGS. 4A and 4B. That is, in order to prevent power supply chattering and element stress, when the input voltage is lower than a normal voltage (such as 10 to 16V in the case of the car battery, for example), the output power of the inverter after the discharge lamp actuation is lowered with respect to that in the normal input voltage operation.

Figure 4C:
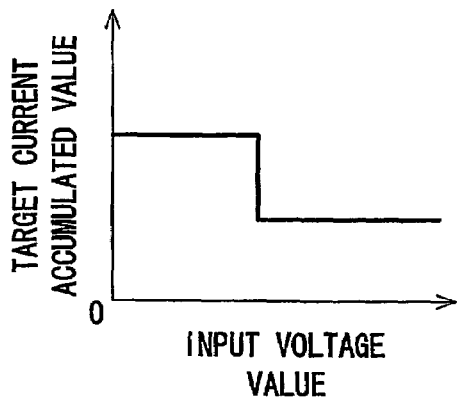
Figure 4D:
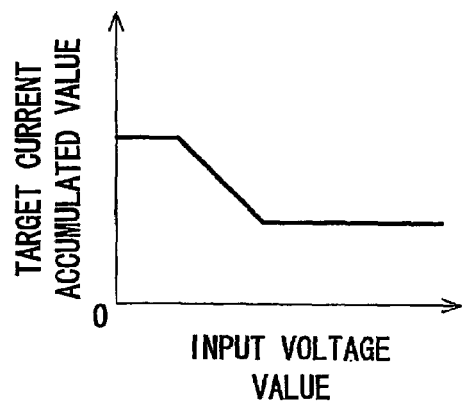

The target current accumulated value setting unit 18 receives the input voltage detection value output of the input voltage detection unit 20 and varies the accumulated value of the target lamp current. As shown in FIGS. 4C and 4D, the accumulated value of the target lamp current is varied when the input voltage is lowered than a degree of lowering the target output power by the target power setting unit 11. Thus, when the input voltage is lowered, the target lamp current accumulated value is set so as to be greater than the normal value. For example, in the case of a non-mercury metal halide lamp for the car headlight, the target lamp current accumulated value is set at 50 mAs in general and when the input voltage is lowered to 10V or less, the target lamp current accumulate value is set at 100 mAs. This set value is merely an example and the present invention is not limited to this.

In the above constitution and operation, when the input voltage is lowered and the output power is reduced, the alternation time is increased by setting the lamp current accumulated value to be a greater value in the electrode heating period. Thus, insufficiency of electrode heating for the discharge lamp because of the output power reduction can be eliminated, and even when the input voltage is lowered, the discharge lamp can be surely actuated to be turned on. In addition, when the input voltage is at the normal value, the alternation time is not unnecessarily increased and there is no problem such that the life of the discharge lamp is reduced.

Moreover, as shown in FIG. 4D, the target lamp current accumulated value may be set at a greater value as the input voltage becomes lower.

According to the above constitution and the operation, in the case where the input voltage is lowered and the output power is reduced, the alternation time is more appropriately set according to the degree of the reduction. Thus, even when the input voltage is reduced, the discharge lamp can be surely actuated to be turned on and the problem such that the life of the discharge lamp is reduced can be eliminated.

Embodiment 2

Figure 5:
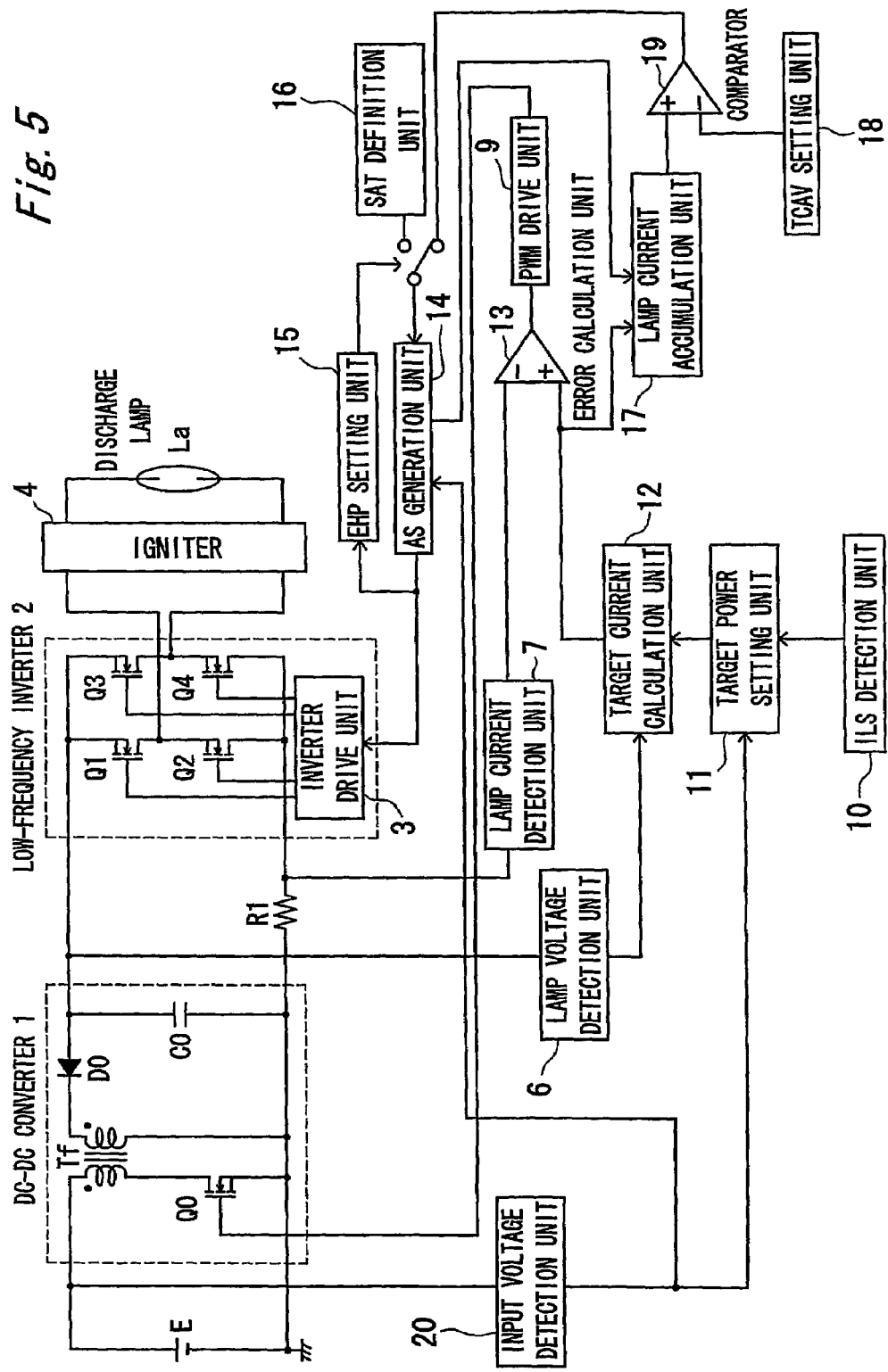
FIG. 5 is a circuit diagram according to an embodiment 2 of the present invention.

FIG. 5 is a circuit diagram showing a second embodiment 2 of a discharge lamp lighting apparatus according to the present invention. In this embodiment, an alternation signal generation unit 14 receives an output of an input voltage detection unit 20 and when the input voltage is lowered, generation of an alternation signal is delayed by a predetermined time. Similar to the embodiment 1, the predetermined delay time may be changed step by step according to the lowering of the input voltage, or the predetermined delay time may be gradually elongated as the input voltage becomes lower.

According to the above constitution and the operations, the alternation time is not set by a lamp current accumulated value for an electrode heating period (although it is not shown), and there is a merit in which application is easy even when the alternation time is set depending on an output of an initial lamp state detection unit 10, for example.

Meanwhile, although an output of a target current calculation unit 12 is input to a lamp current accumulation unit 17 in this embodiment, the same effect can be obtained in even the case where the output of the lamp current detection unit 7 as shown in FIG. 1 is applied as an input to the lamp current accumulation unit 17 in the present invention.

In addition, although it is not shown, even when not a target power value but a target current value is reduced according to the lowering of the input voltage, the present invention described in the embodiments 1 and 2 can be applied.

Embodiment 3

Figure 6:
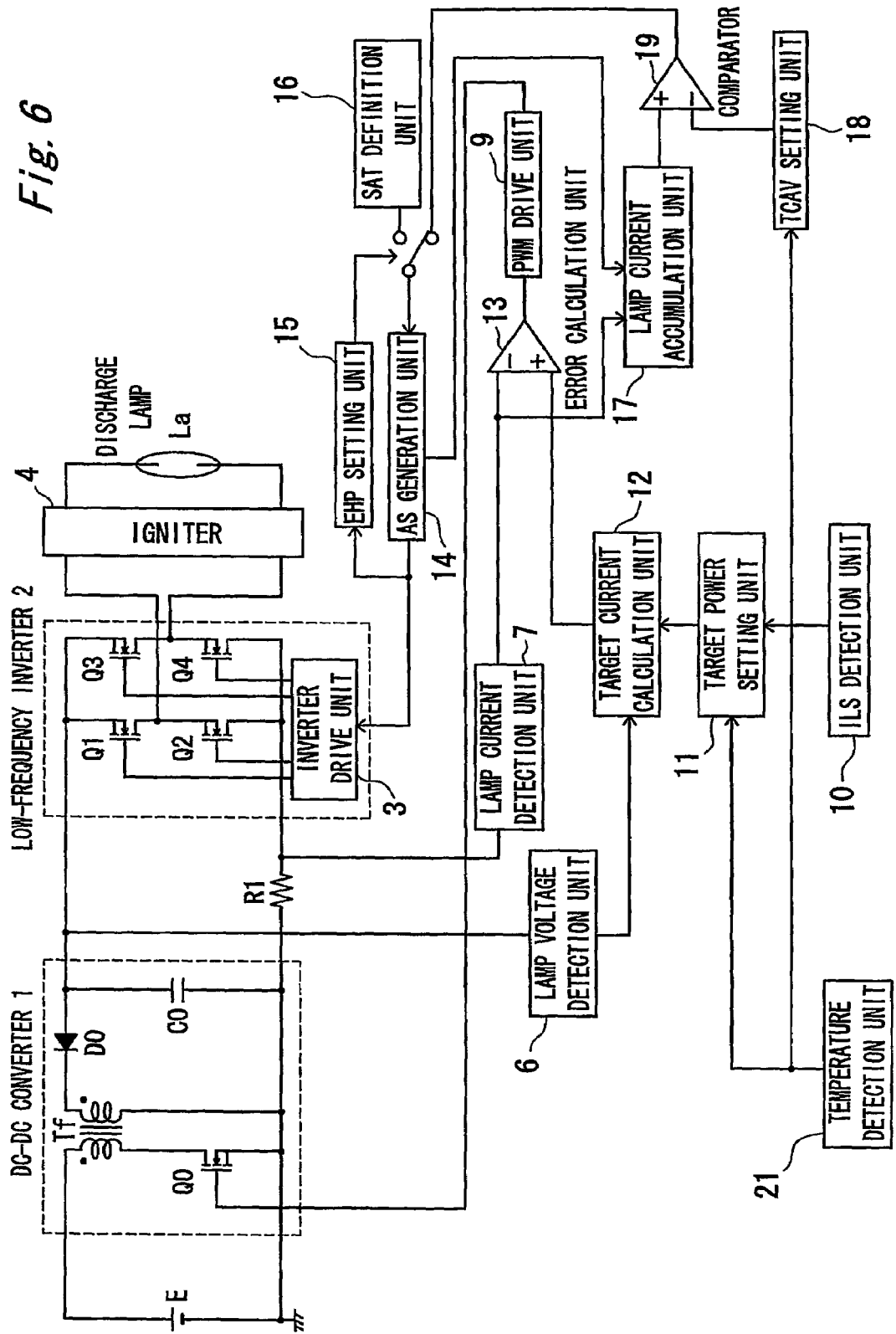
FIG. 6 is a circuit diagram according to an embodiment 3 of the present invention.

FIG. 6 is a circuit diagram showing an embodiment 3. The same reference numerals and signs are allotted to the same components as in the embodiment 1 shown in FIG. 1 and the descriptions thereof are omitted and only difference points will be described. As shown in FIG. 6, a temperature detection unit 21 detects a temperature of a lighting apparatus. For example, a thermistor is used for detecting a temperature of a portion on a mounting substrate. A target power setting unit 11 receives a detected temperature value output of the temperature detection unit 21 and sets an upper limit in setting a target power. Thus, when the temperature is high, the target power setting unit 11 sets the target value so as not to be greater than the upper limit in order to limit an output power. That is, in order to prevent element stress, when the detection temperature becomes higher than a normal temperature i.e., an upper limit is 105° C., for example), the output power after a discharge lamp actuation is lowered as compared with the normal temperature operation.

A target current accumulated value setting unit 18 also receives an output of the temperature detection unit 21 and varies a target current accumulated value of a lamp current. The target lamp current accumulated value is varied by the target current accumulated value setting unit 18 when the temperature rises more than a degree that the output power can be lowered by the target power setting unit 11. When the temperature rises more than the above degree, the target lamp current accumulated value is varied and set to be greater than usual. For example, in the case of using a non-mercury metal halide lamp for a car headlight, the target lamp current accumulated value is usually set at 50 mAs, and when the temperature rises up to 105° C. or more, the target lamp current accumulated value is set at 100 mAs.

In addition, similar to the embodiment 1, the target lamp current accumulated value may be set to be a greater value as the temperature rise greater.

In the above constitution and operation, when the temperature of the lighting apparatus rises and the output power is reduced, the alternation time in the electrode heating period is increased by setting the lamp current accumulated value to be greater. Thus, insufficiency of electrode heating for the discharge lamp because of the output power reduction can be prevented, and even when the temperature rises above the degree, the discharge lamp can be surely actuated to be turned on. In addition, when the temperature is at the normal level, the alternation time in the electrode heating period is not unnecessarily increased and there is no problem such that the life of the discharge lamp is reduced.

Furthermore, it is noted that, if an alternation signal generation unit 14 directly receives an output of the temperature detection unit 21 and detects a temperature rise (although not shown), generation of the alternation signal by the alternation signal generation unit 14 can be delayed by a predetermined time in a similar manner to the embodiment 2. In this case, the same effect as in the embodiment 2 can be obtained.

Embodiment 4

Figure 7:
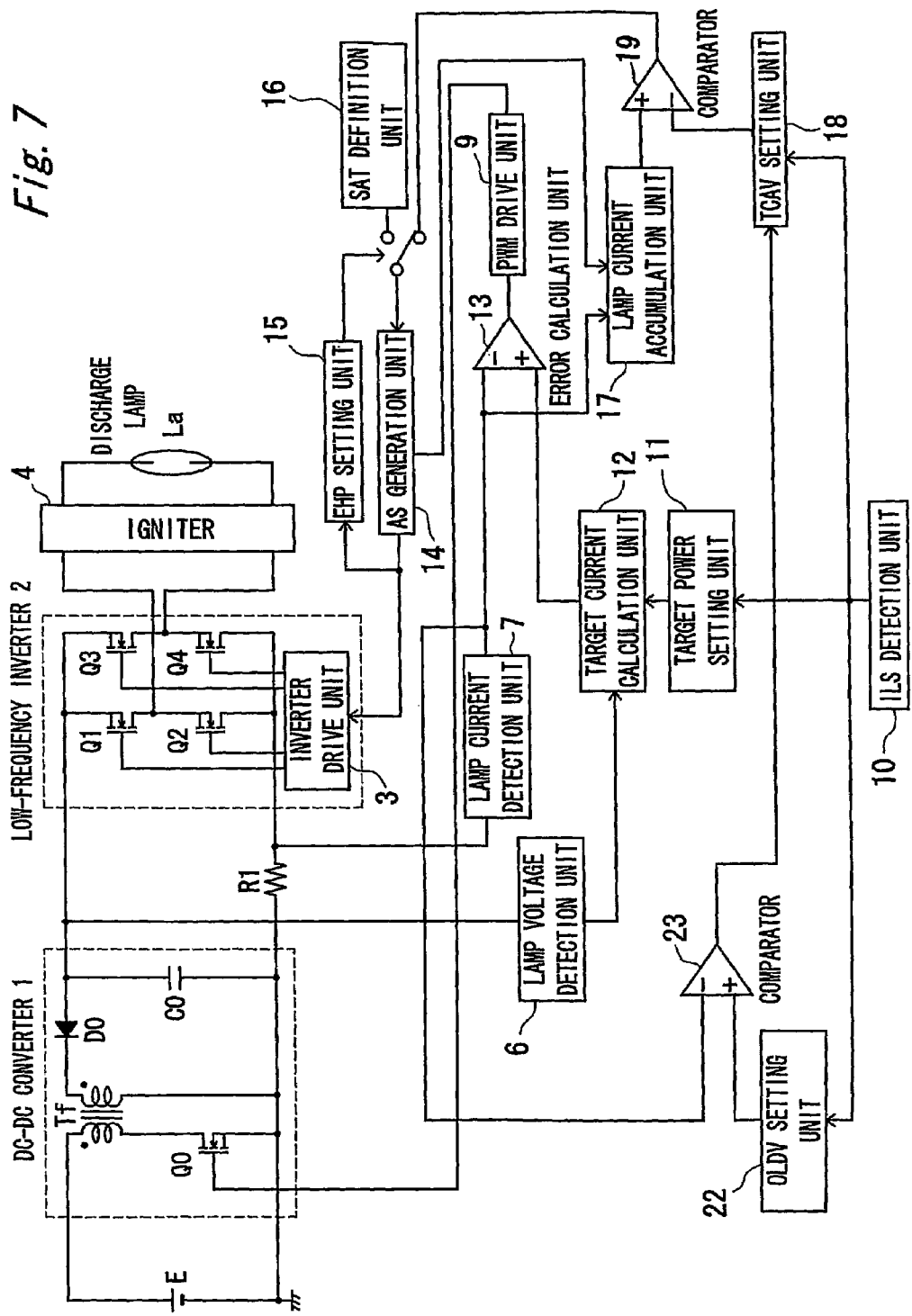
FIG. 7 is a circuit diagram according to an embodiment 4 of the present invention.

FIG. 7 is a circuit diagram showing an embodiment 4. The same reference numerals and signs are allotted to the same components as in the embodiment 1 shown in FIG. 1 and their descriptions are omitted and only difference points will be described. A predetermined value setting unit 22 for determining the output lowering (which is designated as "OLDV SETTING UNIT" in the drawings) sets a predetermined value for determining lowering of an output current for the discharge lamp. The predetermined value set by the predetermined value setting unit 22 is applied to a comparator 23, and the comparator 23 compares the value with a current detection value (corresponding to a lamp current value) output from a lamp current detection unit 7. When the lamp current value is lower than the predetermined value, the comparator 23 outputs the comparison result to a target current accumulated value setting unit 18 so as to increase a target current accumulated value.

The predetermined value setting unit 22 sets the predetermined value depending on an initial lamp state output from an initial lamp state detection unit 10, and the predetermined value is set to be a greater value as an arc tube temperature of the discharge lamp when starting actuation is lower.

Furthermore, when a command such that the target current accumulated value is to be increased is sent from the comparator 23 to the target current accumulated value setting unit 18, the target current accumulated value setting unit 18 sets the target current accumulated value according to the initial lamp state output of the initial lamp state detection unit 10, and the target current accumulated value is set to be a greater value as the arc tube temperature of the discharge lamp at the time of starting actuation is lower.

In the above constitution and operations, even when the output power for the discharge lamp is lowered because the input voltage is lowered or the apparatus temperature rises, or when the output is lowered for some reason, for example, in a case where the lamp current is lowered because of characteristics of the discharge lamp, the alternation time of the output power in the electrode heating period is set longer than usual. Thus, the insufficiency of heating for the electrode can be eliminated and the discharge lamp can be surely actuated to be turned on. In addition, since the predetermined value for determining the output lowering is varied according to the state of the discharge lamp at the time of actuation start, the output lowering can be surely determined by acquiring the difference in the output state from the usual starting, regardless of the initial state of the discharge lamp at the time of starting actuation. Furthermore, since the target current accumulated value is set according to the state of the discharge lamp at the time of starting actuation, an electrode heating amount in the electrode heating period can be set more appropriately, and the discharge lamp can be surely actuated to be turned on without affecting on the life of the discharge lamp.

Embodiment 5

Figure 8:
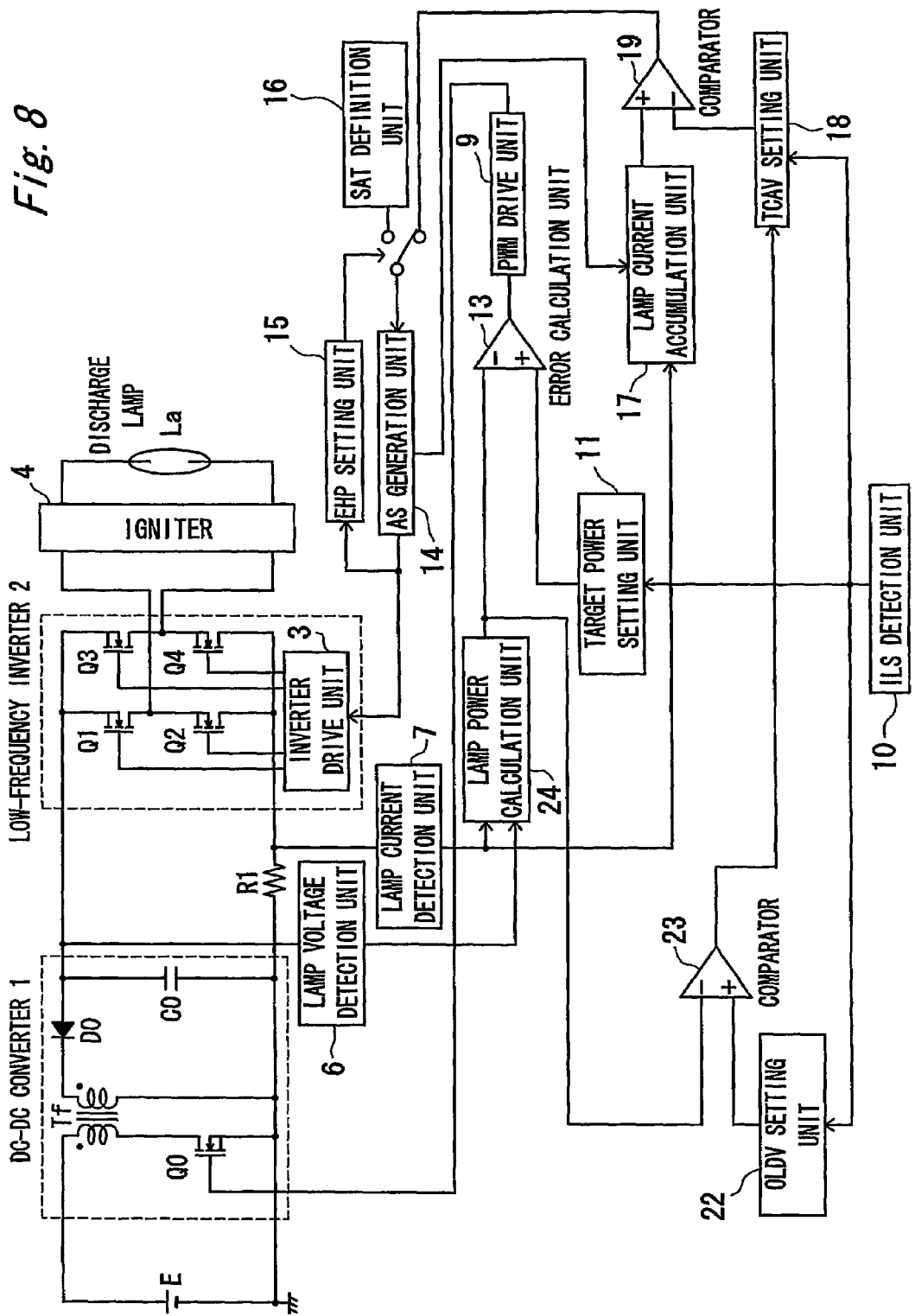
FIG. 8 is a circuit diagram according to an embodiment 5 of the present invention.

FIG. 8 is a circuit diagram showing an embodiment 5. Only difference points from the embodiment 4 will be described. A lamp power calculation unit 24 multiplies an output of a lamp voltage detection unit 6 and an output of a lamp current detection unit 7 to provide a value corresponding to a lamp power and the calculated lamp power is supplied to an error calculation unit 13. The error calculation unit 13 compares a target power value output from a target power setting unit 11 with the lamp power output from the lamp power calculation unit 24, and the error calculation result is applied to a PWM drive unit 9. Thus, switching control of a DC-DC converter 1 is performed so that the lamp power may become the target power.

A predetermined value setting unit 22 for determining output lowering sets a predetermined value to determine the lowering of the output power, and a comparator 23 compares the predetermined value with the lamp power calculated by the lamp power calculation unit 24. When it is determined that the lamp power is lower than the predetermined value, a command is applied to a target current accumulated value setting unit 18 such that a target current accumulated value is to be increased.

In the above constitution and the operations, since the lowering of the output power is directly observed, it can be surely determined whether the output power is lowered without being influenced by variation of the discharge lamp, and insufficiency of heating for the electrode because of the lowering of the output power can be eliminated.

Embodiment 6

Figure 9:
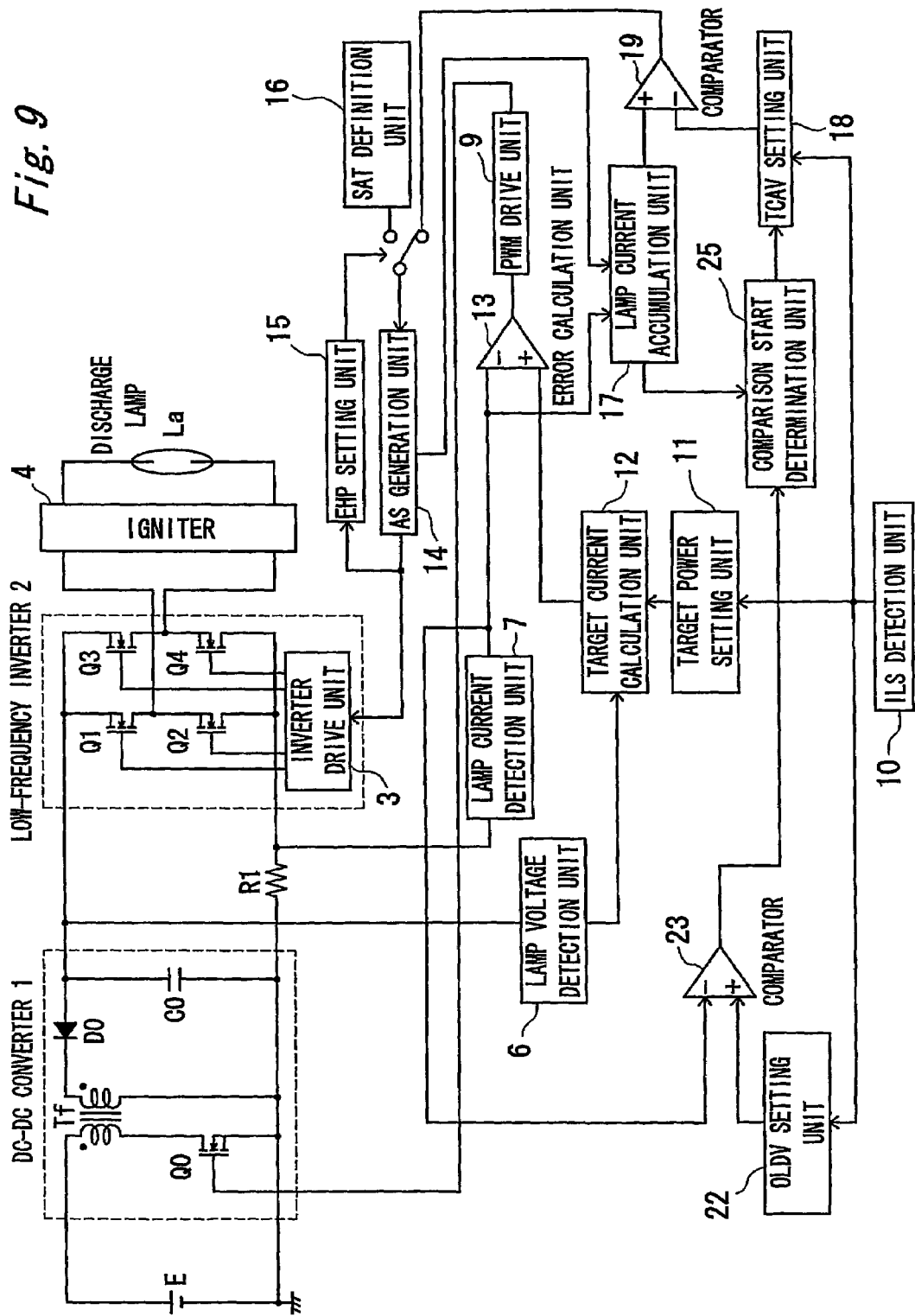
FIG. 9 is a circuit diagram according to an embodiment 6 of the present invention.

FIG. 9 is a circuit diagram showing an embodiment 6. This embodiment is different from the embodiment 4 in providing a comparison start determination unit 25. The comparison start determination unit 25 receives a target current accumulated value increase command signal which is an output of a comparator 23 and a lamp current accumulated value which is an output of a lamp current accumulation unit 17. The comparator 23 compares a lamp current value output from a lamp current detection unit 7 with a predetermined value for determining output lowering which is an output of a predetermined value setting unit 22.

A filtered target current accumulated value increase command signal which is an output of the comparison start determination unit 25 is applied to a target current accumulated value setting unit 18. Upon receipt of the filtered target current accumulated value increase command signal, the target current accumulated value setting unit 18 increases a target current accumulated value.

The comparison start determination unit 25 filters (i.e., masks) the target current accumulated value increase command signal applied from the comparator 23 until the lamp current accumulated value becomes a predetermined lamp current accumulated value.

Figure 10:
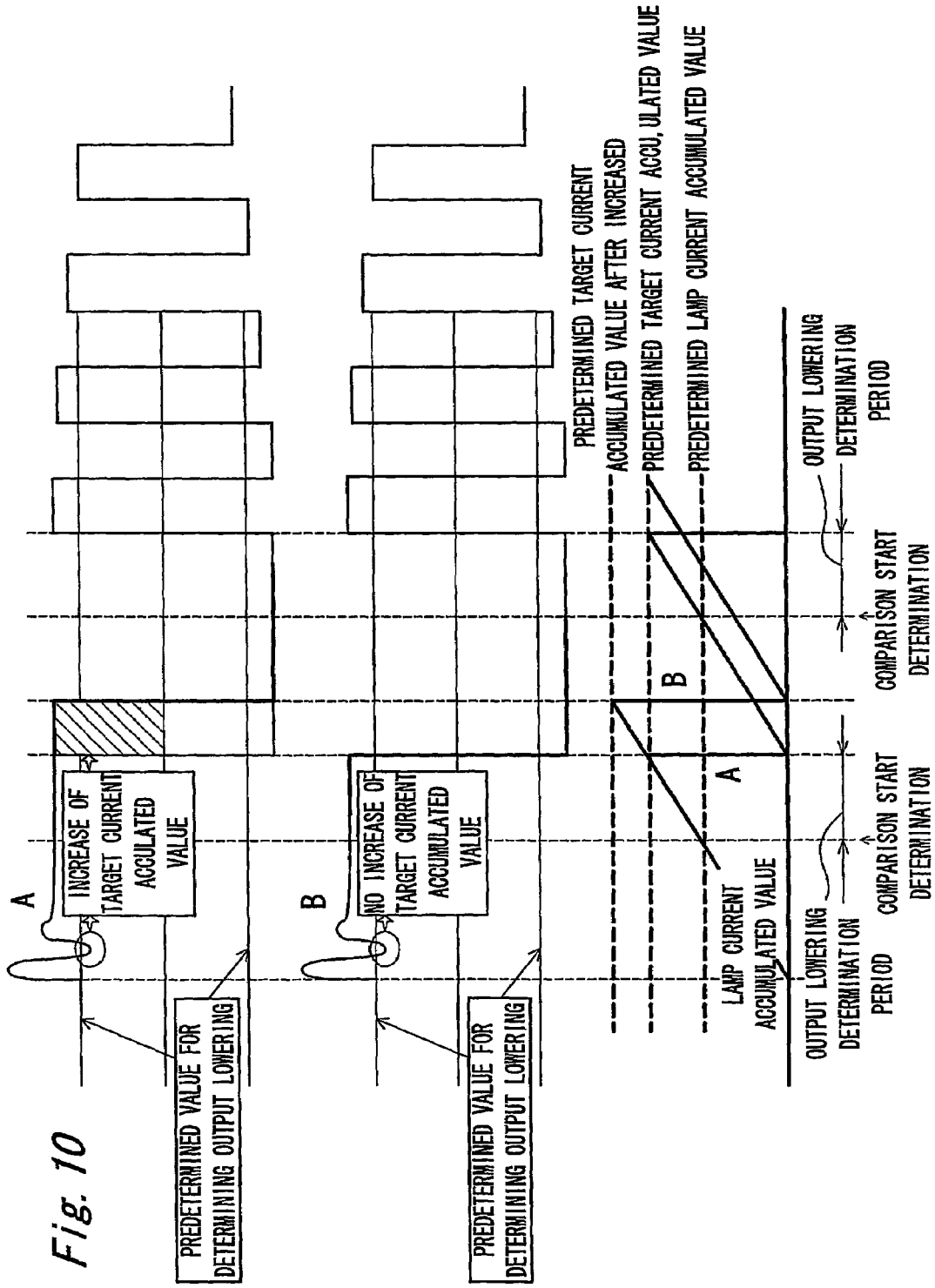
FIG. 10 is a view for explaining operations according to the embodiment 6 of the present invention.

Thus, as shown in FIG. 10, even when the lamp current value is smaller than the predetermined value for determining the output lowering as shown by a waveform B, since the lamp current accumulated value does not become the predetermined value at that time, the target current accumulated value is not increased in the embodiment 6. Whereas, in the embodiment 4 shown in FIG. 7, when it is detected that the lamp current is smaller than the predetermined value for determining the output lowering as shown by a waveform A, the target current accumulated value is increased.

The lamp current is unstable in an initial stage of lighting or just after an output polarity is inverted by a low-frequency inverter. Therefore, there is a case where the target current accumulated value is erroneously increased when detecting the lowering of the unstable lamp current in the embodiment 4. In contrast, according to the embodiment 6 shown in FIG. 9, since the increase in target current accumulated value is not determined until the lamp current accumulated value reaches the predetermined value, the above unnecessary increase in the target current accumulated value can be prevented and an influence on the life can be reduced.

In addition, although the comparison start determination unit 25 filters the target current accumulated value increase command signal until the lamp current accumulated value becomes the predetermined lamp current accumulated value in this embodiment, the same effect can be obtained even when filtering the target current accumulated value increase command signal for a predetermined time after inversion.

Embodiment 7

Figure 11:
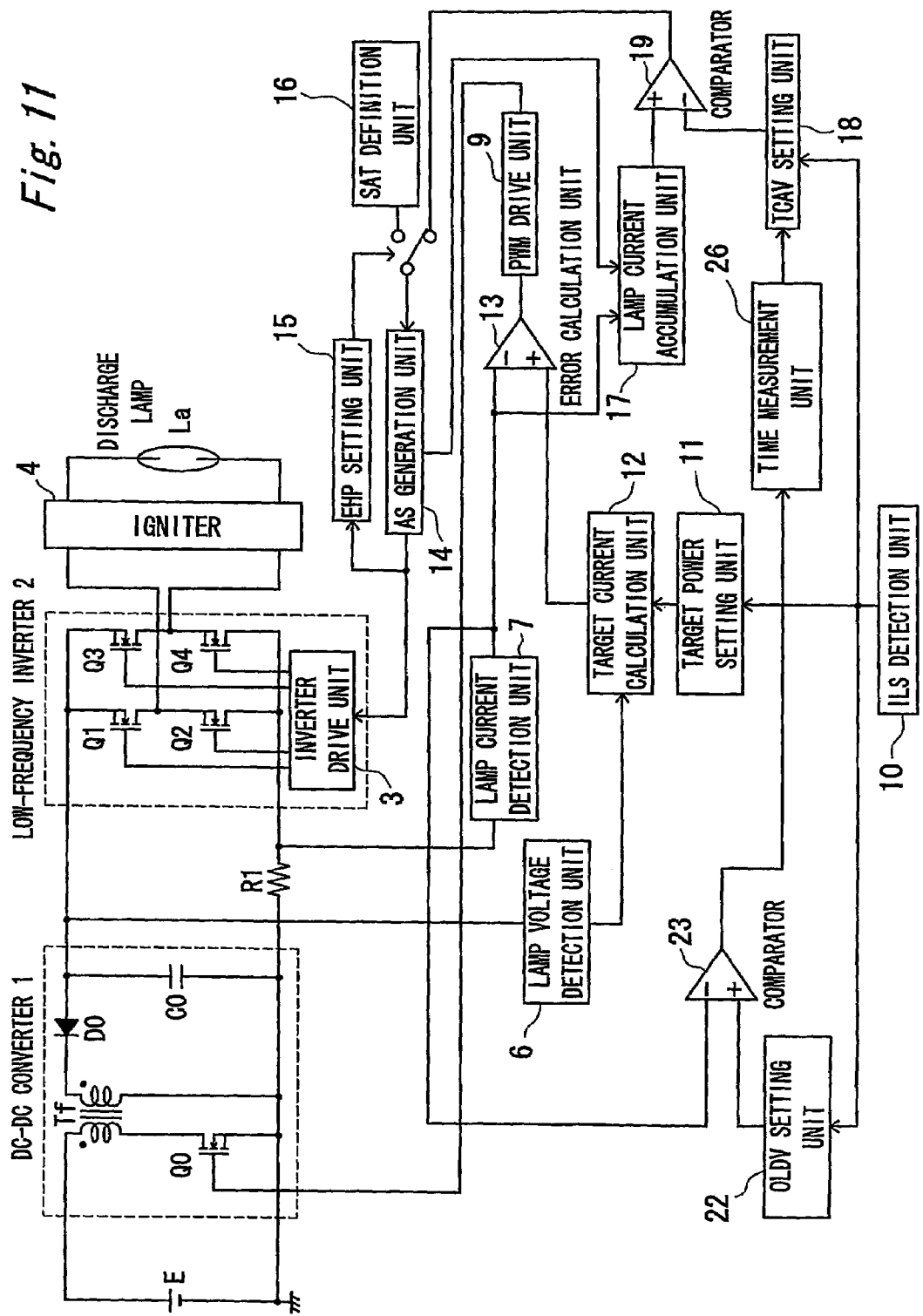
FIG. 11 is a circuit diagram according to an embodiment 7 of the present invention.

FIG. 11 is a circuit diagram showing an embodiment 7 of the present invention. This embodiment is different from the embodiment 4 in providing a time measurement unit 26. The time measurement unit 26 receives a target current accumulated value increase command signal which is an output of a comparator 23. The comparator 23 compares a lamp current value which is an output of a lamp current detection unit 7 with a predetermined value for determining output lowering which is an output of a predetermined value setting unit 22.

The time measurement unit 26 outputs a continuity-confirmed target current accumulated value increase command signal to be applied to a target current accumulated value setting unit 18. Upon receipt of the continuity-confirmed target current accumulated value increase command signal, the target current accumulated value setting unit 18 increases a target current accumulated value.

After the time measurement unit 26 receives the target current accumulated value increase command signal from the comparator 23 showing that the lamp current is smaller than the predetermined value for determining the output lowering, the time measurement unit 26 starts the time measurement. Then, when the target current accumulated value increase command signal is continuously supplied and the time measurement value exceeds a predetermined time, the continuity-confirmed target current accumulated value increase signal is output from the time measurement unit 26 and applied to the target current accumulated value setting unit 18. However, when the lamp current value exceeds the predetermined value for determining the output lowering in the process of the time measurement and there is no target current accumulated value increase command signal any more, the measured time is cleared.

Figure 12A:
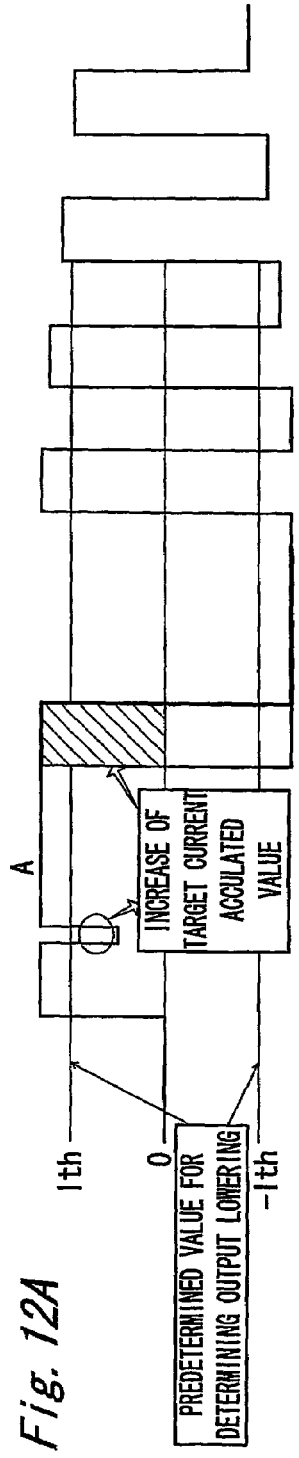
FIGS. 12A, 12B and 12C are views for explaining operations according to the embodiment 7 of the present invention.
Figure 12B:
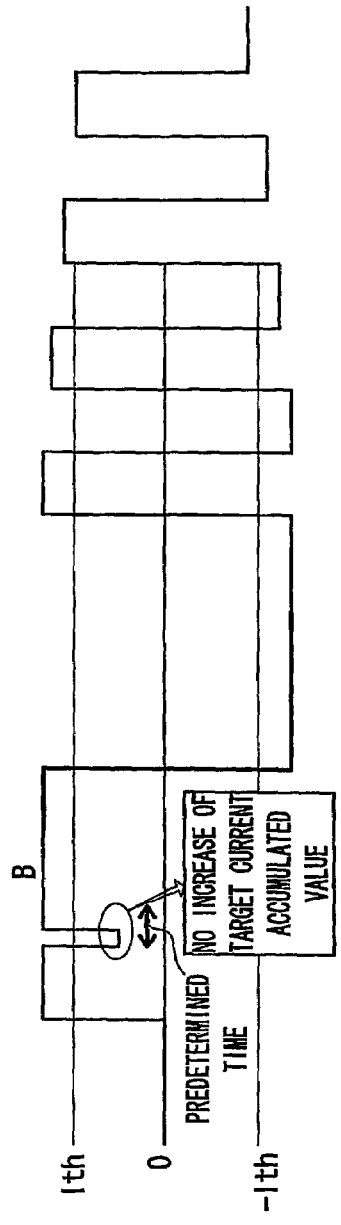
Figure 12C:
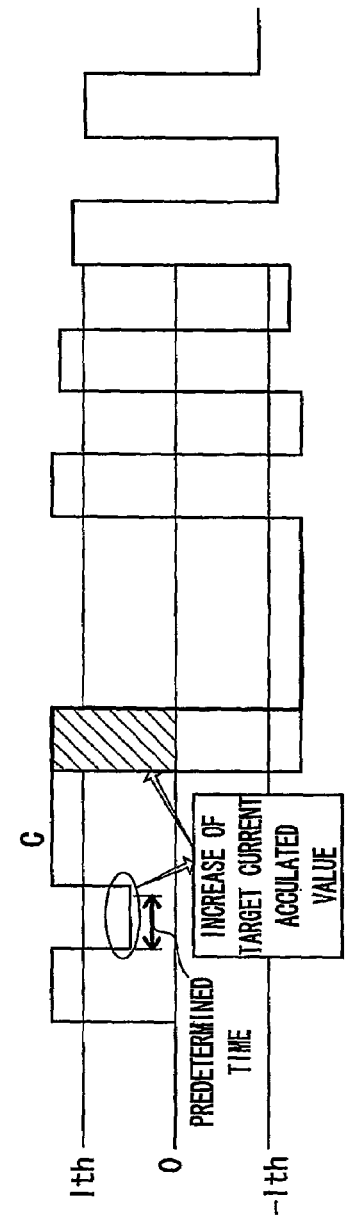

FIGS. 12A, 12B and 12C show views for explaining the operations. According to the embodiment 4 shown in FIG. 7, as shown by a waveform A in FIG. 12A, when it is detected that the lamp current becomes smaller than a predetermined value Ith for determining the output lowering, the target current accumulated value is increased. Meanwhile, according to the embodiment 7 shown in FIG. 11, as shown by a waveform B in FIG. 12B, in the case where the time period when the lamp current value becomes smaller than the predetermined value for determining the output lowering is shorter than the predetermined time, the target current accumulated value is not increased. In addition, as shown by a waveform C in FIG. 12C, in a case where the time period when the lamp current value becomes smaller than the predetermined value for determining the output lowering becomes longer than the predetermined time, the target current accumulated value is increased.

The lamp current detection value is changed by a noise and the like in some cases. According to the embodiment 4 shown in FIG. 7, the target current accumulated value is increased when the lamp current value instantaneously becomes smaller than the predetermined value for determining the output lowering because of the noise and the like. Meanwhile, by the operations of this embodiment 7, the above unnecessary increase of the target current accumulated value can be prevented and an influence on the life of the discharge lamp can be reduced.

Embodiment 8

Figure 13:
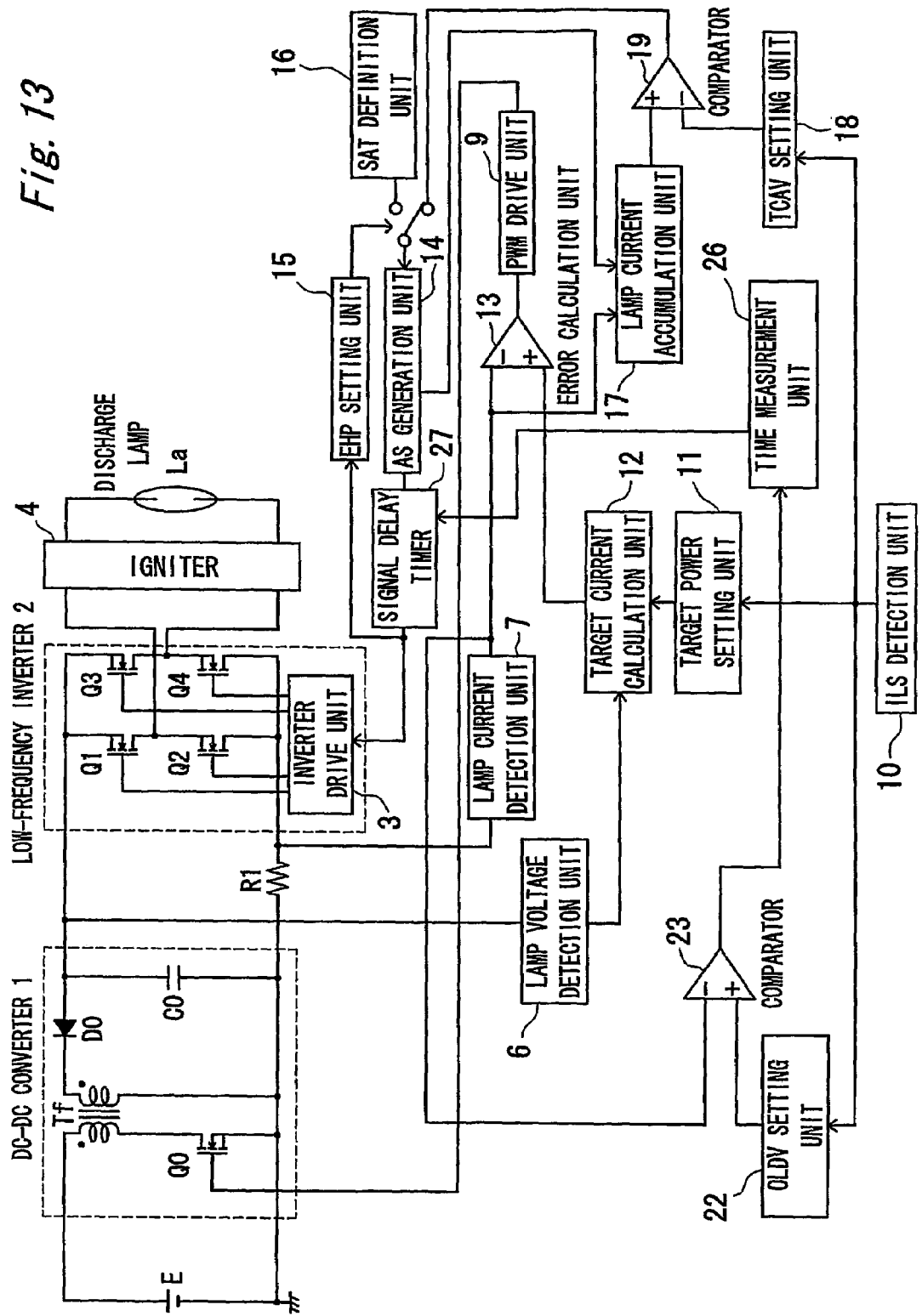
FIG. 13 is a circuit diagram according to an embodiment 8 of the present invention.

FIG. 13 is a circuit diagram showing an embodiment 8. Although the time measurement unit 26 outputs the continuity-confirmed target current accumulated value increase command signal to be applied to the target current accumulated value setting unit 18 in the embodiment 7, according to the embodiment 8 as shown in FIG. 13, an inversion delay signal is output from the time measurement unit 26 and applied to a signal delay timer 27 which is provided at a subsequent stage of an alternation signal generation unit 14. When the signal delay timer 27 receives the inversion delay signal, it delays an alternation signal output from the alternation signal generation unit 14 by a predetermined time.

FIGS. 14A and 14B show views for explaining the operations. According to the embodiment 7, in the case where the time period when the lamp current value is smaller than the predetermine value for determining the output lowering becomes longer than the predetermined time, the target current accumulated value is increased as shown by the waveform C. Meanwhile, according to the embodiment 8, since the alternation signal is delayed by the signal delay timer 27 by the predetermined time as shown by a waveform C', almost the same effect can be obtained as the case where the target current accumulated value is increased.

Embodiment 9

Figure 15:
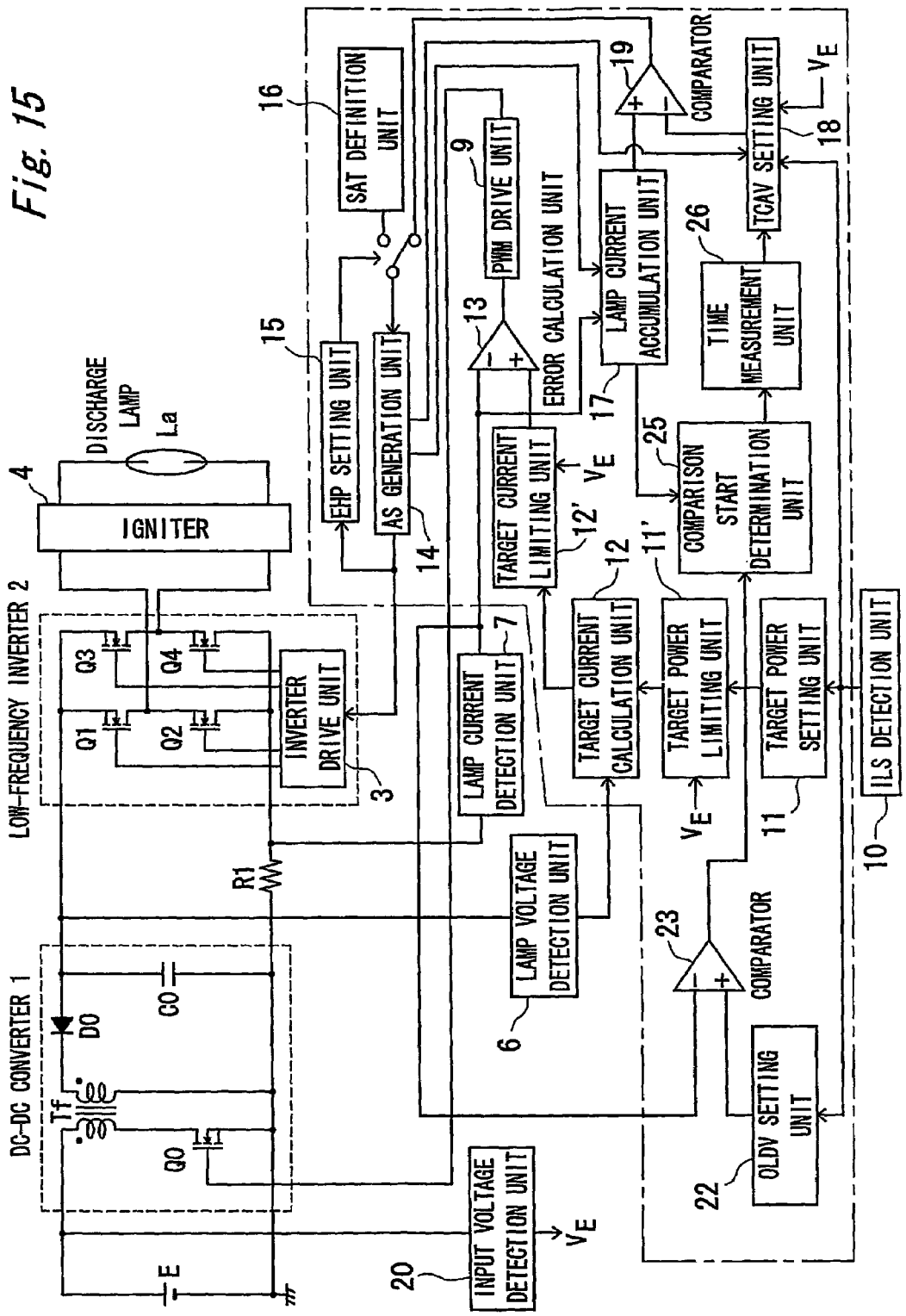
FIG. 15 is a circuit diagram according to an embodiment 9 of the present invention.

FIG. 15 is a circuit diagram showing an embodiment 9. Points different from the embodiment 4 shown in FIG. 7 will be described. First, there is provided a target power limit unit 11' which receives a target power value which is an output of a target power setting unit 11 and applies a limited target power value to a target current calculation unit 12. The target power limit unit 11' limits the target power based on an input voltage value $V_E$. In addition, there is provided a target current limit unit 12' which receives a target current value which is an output of the target current calculation unit 12 and applies a limited target current value to an error calculation unit 13. The target current limit unit 12' limits the target current based on the received input voltage value $V_E$. An input voltage detection unit 20 is provided for detecting an input voltage and applying the input voltage value $V_E$ to the target power limit unit 11', the target current limit unit 12' and the target current accumulated value setting unit 18.

In addition, a comparison start determination unit 25 receives a target current accumulated value increase command signal which is an output of a comparator 23 and a lamp current accumulated value which is an output of a lamp current accumulation unit 17, and outputs a filtered target current accumulated value increase command signal which is applied to a time measurement unit 26. Upon receipt of the filtered target current accumulated value increase command signal, the time measurement unit 26 outputs a filtered and continuity-confirmed target current accumulated value signal to be applied to the target current accumulated value setting unit 18. A target current accumulated value increase clear signal is output from an alternation signal generation unit 14 and applied to the target current accumulated value setting unit 18.

The operations of the respective constitutions will be described hereinafter. The input voltage detection unit 20 reads an input voltage and outputs the input voltage value $V_E$. The target current limit unit 12' reads the input voltage value $V_E$ which is an output of the input voltage detection unit 20 and sets a maximum target current value corresponding to that value and limits the target current value so as to be below the maximum target current value. The target power limit unit 11' reads the input voltage value $V_E$ which is the output of the input voltage detection unit 20 and sets a maximum target power value corresponding to that value and limits the target power value so as to be below the maximum target power value.

The comparison start determination unit 25 filters (or masks) the target current accumulated value increase command signal which is the output from the comparator 23 until the lamp current accumulated value becomes the predetermined lamp current accumulated value, and when the target current accumulated value increase command signal is input after the lamp current accumulated value exceeds the predetermined value, the comparison start determination unit 25 outputs the filtered target current accumulated value increase command signal. The time measurement unit 26 starts the time measurement after the filtered target current accumulated value increase command signal is input from the comparison start determination unit 25. Then, when the filtered target current accumulated value increase command signal is continuously output and the time measurement value exceeds the predetermined time, the time measurement unit 26 outputs the filtered and continuity-confirmed target current accumulated value increase signal to be applied to the target current accumulated value setting unit 18. However, when the filtered target current accumulated value increase command signal disappears in the process of the time measurement, the time measurement value is cleared and when the filtered target current accumulated value increase command signal is input again, the time count is started from zero.

The alternation signal generation unit 14 outputs the inversion signal to an inverter drive unit 3 and at the same time, outputs the target current accumulated value increase clear signal to the target current accumulated value setting unit 18. The target current accumulated value setting unit 18 compares a target current accumulated value UP amount 1 decided depending on the input voltage value $V_E$, a target current accumulated value UP amount 2 determined by the filtered target current accumulated value increase command signal, and the maximum value of the target current accumulated value UP amounts 1 and 2, and then stores the maximum value and adds the maximum value to the target current accumulated value. Upon receipt of the target current accumulated value increase clear signal, the target current accumulated value setting unit 18 clears the stored and added target current accumulated value UP amounts. Thus, the target current accumulated value UP amount is calculated each time the polarity is inverted.

Although the target current accumulated value is increased separately when the input voltage is low and when the lamp current is lowered in the embodiments 1 to 8, an optimal control can be performed by acquiring the maximum value of an increased value of each target current accumulated value in this embodiment. In addition, the target current accumulated value UP amount can be set each time the polarity is inverted by clearing the target current accumulated value UP amount each time the polarity is inverted. As a result, the target current accumulated value can be prevented from being unnecessarily increased and the influence on the life of the discharge lamp can be reduced.

Embodiment 10

Figure 16:
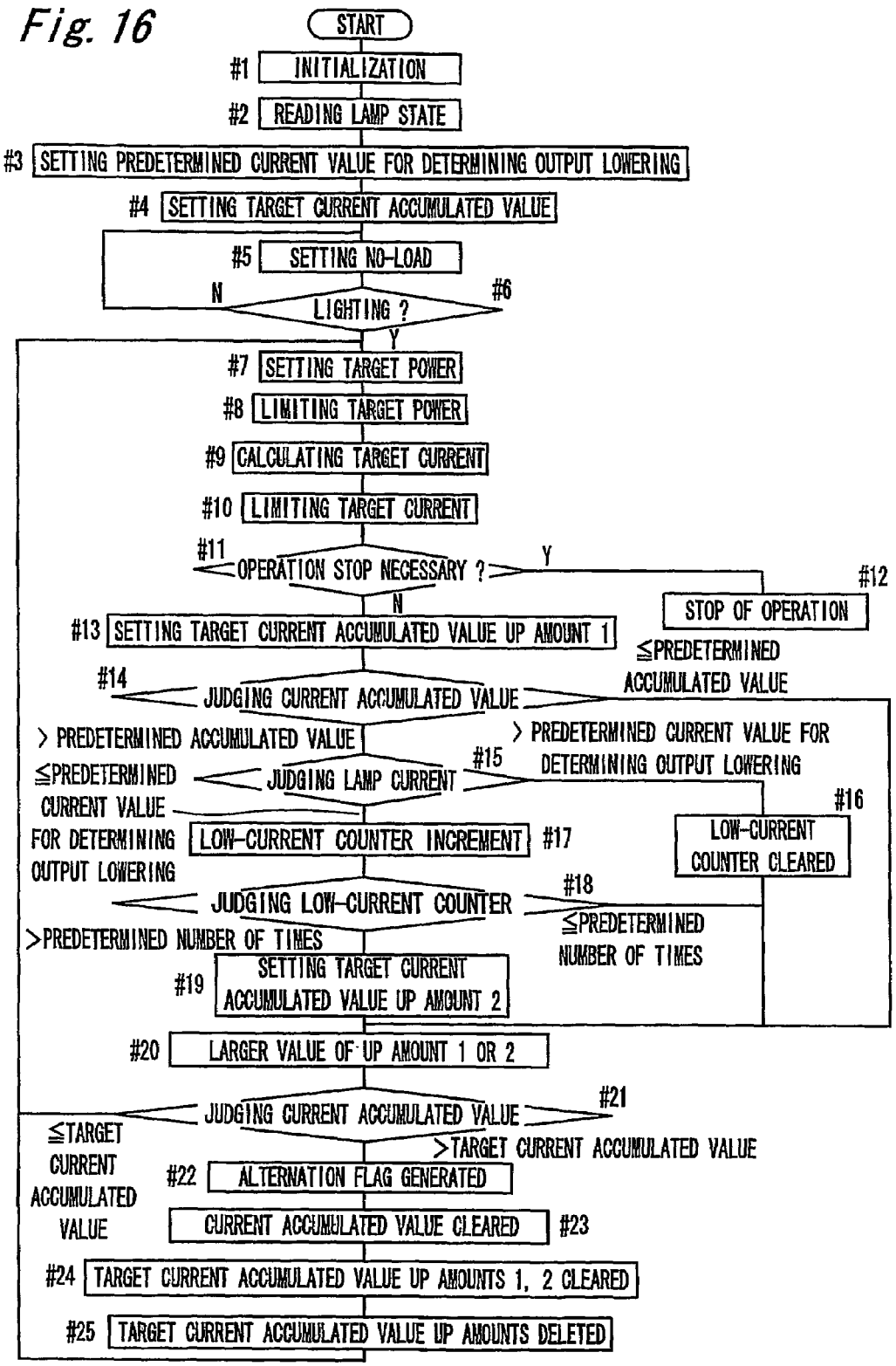
FIG. 16 is a flowchart showing main control according to an embodiment 10 of the present invention.
Figure 17:
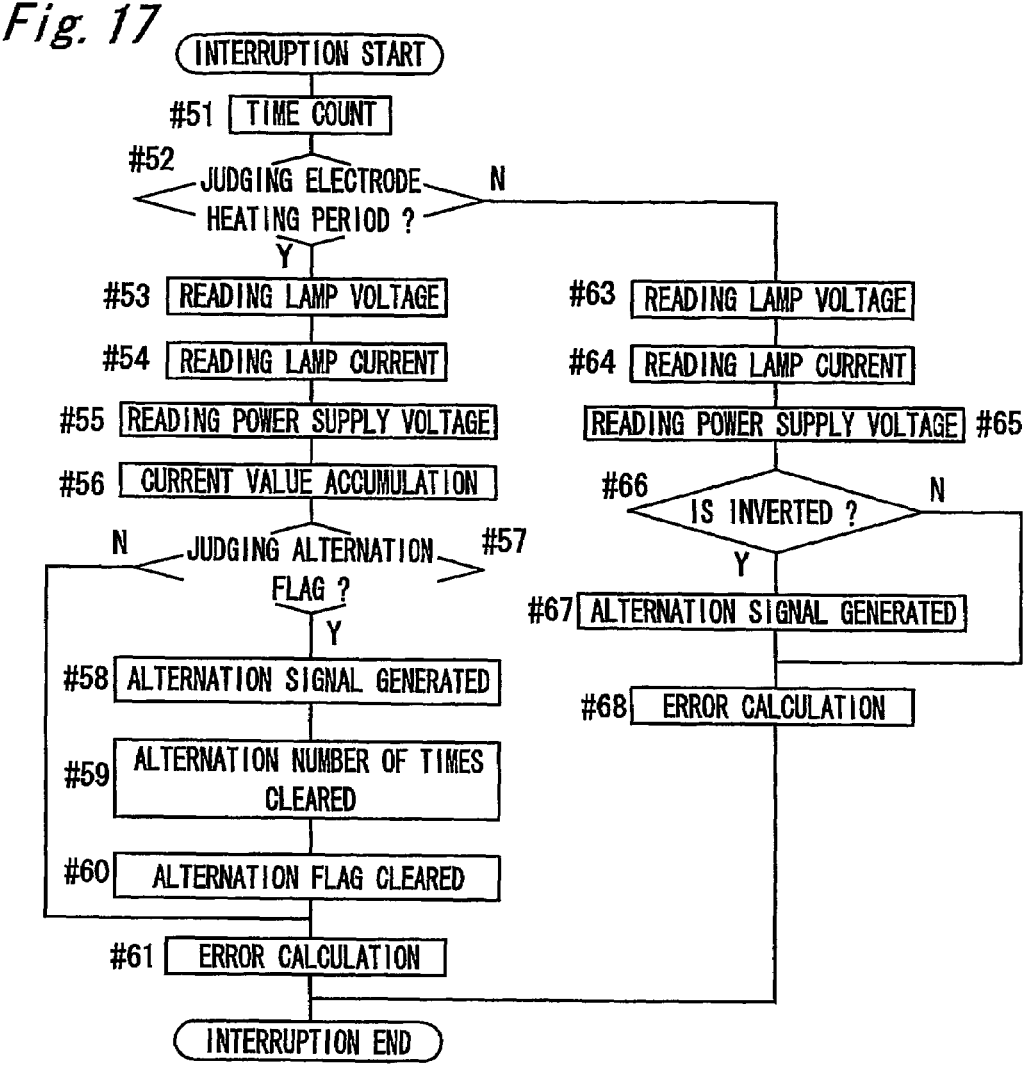
FIG. 17 is a flowchart showing interruption control according to the embodiment 10 of the present invention.

FIGS. 16 and 17 show flowcharts when the embodiment 9 is implemented using a microcomputer. In FIGS. 16 and 17, a process at a part surrounded by a doted line in FIG. 15 is implemented by a program of the microcomputer. The flowcharts show a flow from a state of a lamp not being turned on to a state of the lamp being turned on. Hereinafter, each flow chart will be described.

Steps #1 to #6 in FIG. 16 show from the initial setting process before the lamp is turned on to a no-load operation process. After the lamp is turned on, a loop of #7 to #25 is repeated and steps of #51 to #68 shown in FIG. 17 are carried out as an interrupt at regular time intervals.

Figure 18:
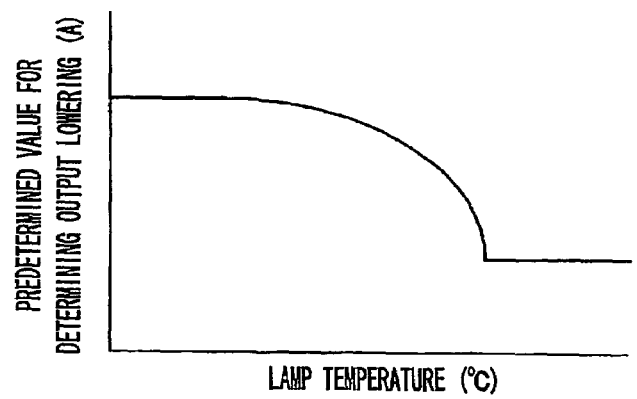
FIG. 18 is a view for explaining a first operation according to the embodiment 10 of the present invention.

The microcomputer is initialized at step #1 and data of a lamp state is read at step #2. A predetermined current value for determining output lowering is set depending on the lamp state at step #3. FIG. 18 shows an example of a setting table. As a lamp temperature becomes higher, the predetermined value for determining the output lowering is set so as to be smaller. A target current accumulated value is set at step #4. Unloaded switching is set at step #5, and ON/OFF of the lamp is determined at step #6 and the no-load operations are repeated until the lamp is turned on. The ON/OFF is determined when a lamp voltage is lowered or a lamp current is increased.

When the discharge lamp is turned on, a target power value (refer to FIG. 2) is set with respect to an elapsed lighting time at step #7 as described in the fundamental operations in the embodiment 1. The target power value is limited depending on an input voltage value and a limited target power value is set at step #8. The limited target power value is divided by a lamp voltage value to calculate a target current value at step #9. The target current value is limited depending on the input voltage value and a limited target current value is set at step #10.

It is determined whether the operation is stopped by determination of power supply OFF or lamp OFF at step #11, and the operation is stopped as needed at step #12.

Figure 19A:
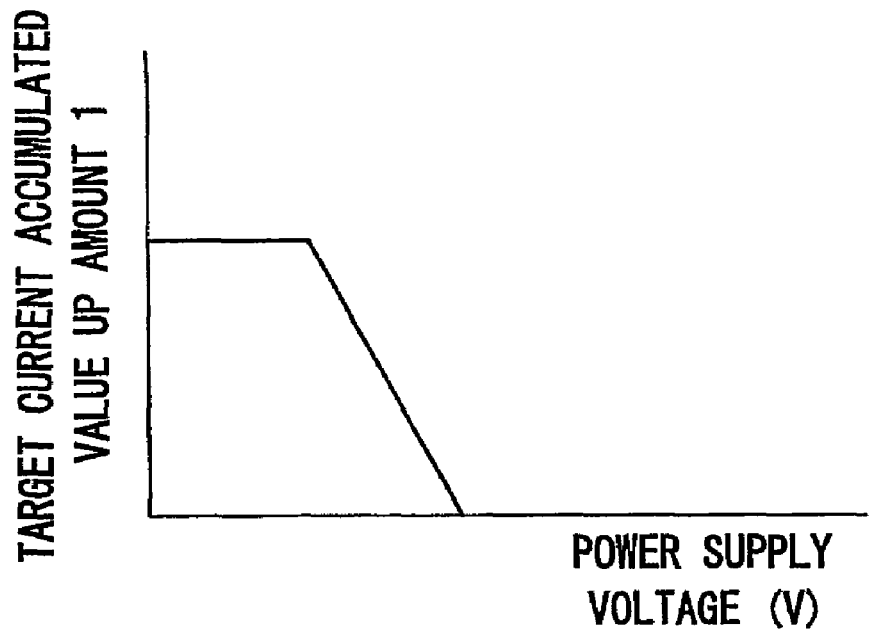
FIGS. 19A and 19B are views for explaining a second operation according to the embodiment 10 of the present invention.

At step #13, it is determined how much the target current accumulated value is increased depending on a power supply voltage and a target current accumulated value UP amount 1 is set. FIG. 19A shows an example of a setting table. When the power supply voltage is high, the target current accumulated value UP amount 1 is set at 0, and as the power supply voltage becomes low, the target current accumulated value UP amount 1 is increased.

At step #14, the current accumulated value is compared with the predetermined current accumulated value, and when the current accumulated value is smaller than the predetermined current accumulated value, subsequent steps #15 to #19 (steps of setting a target current accumulated value UP amount 2 because of the lamp current being lowered) are skipped.

At step #15, the lamp current value is compared with the predetermined value for determining the output lowering and when the lamp current>the predetermined value for determining the output lowering, the operation is moved to step #16. When the lamp current≦the predetermined value for determining the output lowering, the operation is moved to step #17. At step #16, a low-current counter is cleared each time when the lamp current>the predetermined value for determining the output lowering. The low-current counter is a counter to measure a current lowered time, and at step #17, the low-current counter for measuring the current lowered time is incremented. When the low-current counter exceeds the predetermined value at step #18, the operation is moved to step #19. That is, when the state in which the lamp current≦the predetermined value for determining the output lowering is continued for a predetermined time, the operation is moved to step #19. At step #19, the target current accumulated value UP amount 2 is set.

Figure 19B:
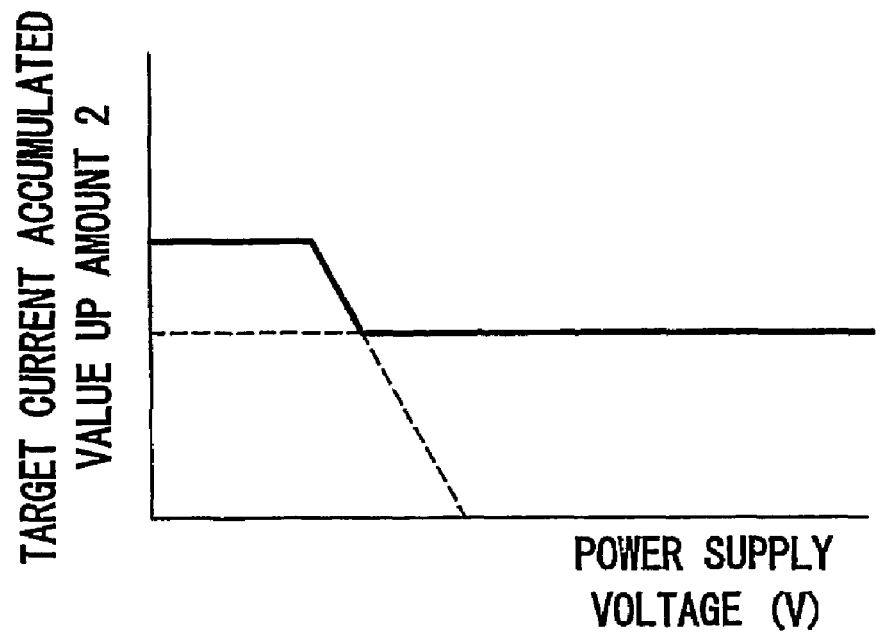

At step #20, the target current accumulated value is reset as an increased value from the value set at step #4. An amount to be increased is the maximum value of the previous increased amount and the target current accumulated value UP amounts 1 and 2:

FIG. 19B shows an example of how to decide the target current accumulated value UP amount. It is assumed that the target current accumulated value UP amount 1 depending on the power supply voltage is the same as in FIG. 19A and the target current accumulated value UP amount 2 because of the lamp current lowering is a constant value. In this assumption, after the lamp current lowering is detected, if the power supply voltage is lowered, a value shown by a thick solid line in FIG. 19B is used as the target current accumulated value UP amount.

At step #21, the current accumulated value and the target current accumulated value are compared, and when the current accumulated value is more than the target current accumulated value, the operation is moved to step #22 to establish an alternation flag. If the alternation flag is established at the time of interruption at steps #51 to #68, the alternation signal is generated.

At step #23, the current accumulated value is cleared. That is, when the electrode heating period is continued, accumulation is started from 0 again. At step #24, the target current accumulated value UP amounts 1 and 2 are cleared. At step #25, the present target current accumulated value UP amount is cleared. Thus, after the polarity is inverted, the power supply voltage is returned and when the lamp current becomes more than the predetermined value for determining the output lowering, the target current accumulated value is not increased at the next time of polarity inversion.

At step #51 in FIG. 17, a time is counted by counting the number of times of generations of the interruption. That is, the time after the lighting is started is measured using the interruption provided at regular time intervals. At step #52, it is determined whether the current state is in the electrode heating period or not. In the case of the electrode heating period, the operation is moved to step #53 and in the case of not the electrode heating period, the operation is moved to step #63. More specifically, since the number of inversion times for the electrode heating period is counted, the determination is performed by comparing that value with the predetermined value.

At steps #53 to #55, the lamp voltage, the lamp current and the power supply voltage are read. At step #56, the current value is accumulated. At step #57, the alternation flag set at step #22 is determined. When the alternation flag is standing, the alternation signal is generated at step #58 and the number of alternations is counted at step #59 and the alternation flag is cleared at step #60. At step #61, an error calculation is performed by comparing the limited target current value with the lamp current value, and a signal for driving the DC-DC converter is output.

At steps #63 to #65, the lamp voltage, the lamp current and the power supply voltage are read. At step #66, it is determined whether the polarity is inverted or not by the time count value, and when the predetermined time elapsed, the alternation signal is output at step #67. At step #68, an error calculation is performed by comparing the limited target current value with the lamp current value, and a signal for driving the DC-DC converter is output.

Figure 20:
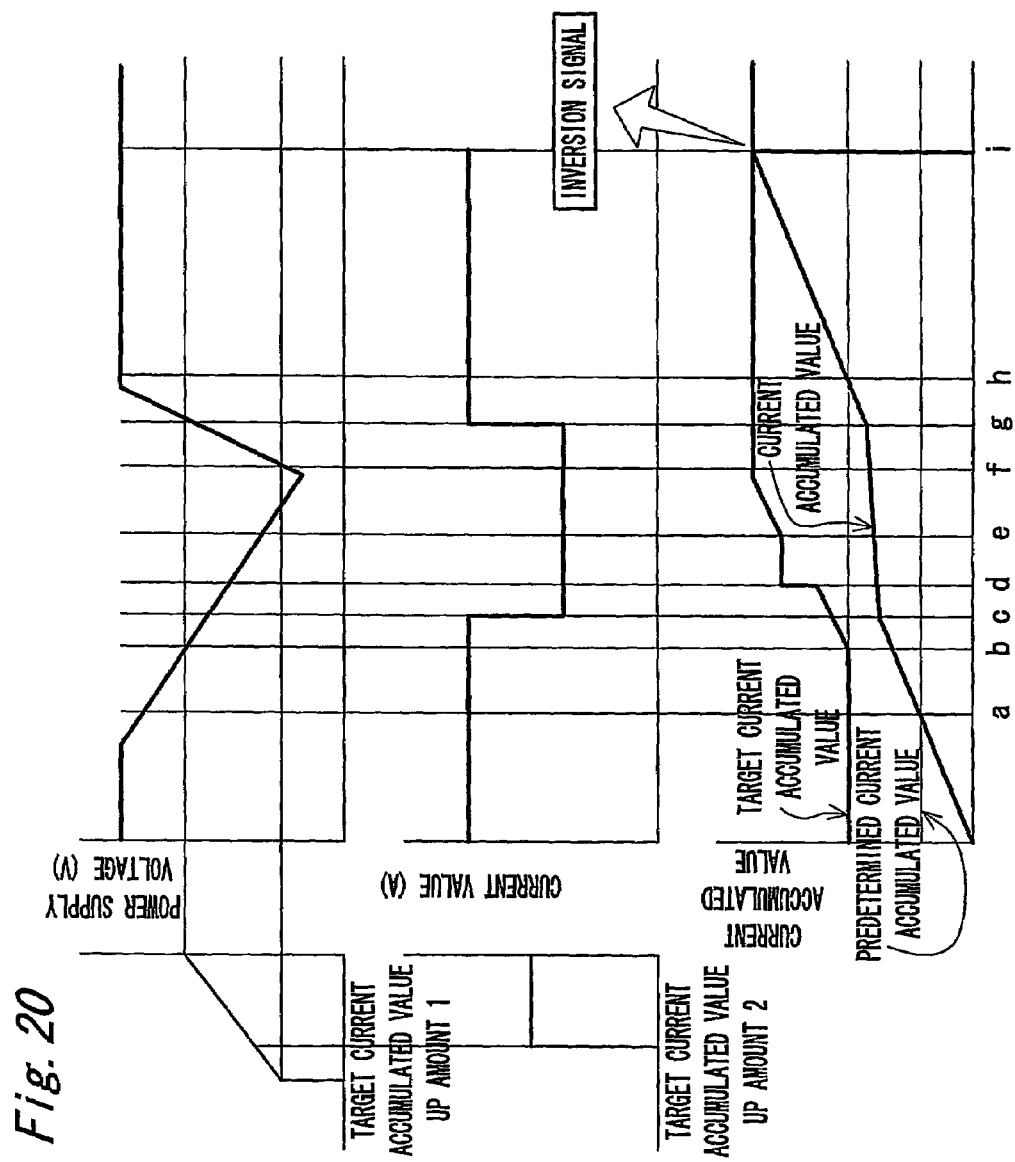
FIG. 20 is a view for explaining a third operation according to the embodiment 10 of the present invention.

FIG. 20 shows an example of a variation of the target current accumulated value according to this embodiment. Timings a to h in the FIG. 20 and the variation of the target current accumulated value during the timings will be described. In a period from the lighting to the timing a, even when it is detected that the lamp current is low, since it is filtered, only the target current accumulated value UP amount 1 because of the power supply voltage is varied. However, since the power supply voltage is not lowered, there is no variation after the initial setting (#1 to #4).

At the timing a, the current accumulated value reaches the predetermined current accumulated value (#14). In the period from the timings a to b, although the power supply voltage is lowered, since the target current accumulated value is 0, there is no variation. At the timing b, the target current accumulated value UP amount 1 starts to be increased because the power supply voltage is lowered. In the period from the timings b to c, the target current accumulated value is increased depending on the input voltage.

At the timing c, the lamp current value is lower than the predetermined current value for determining the output lowering. In the period from the timings c to d, although the lamp current is lower than the predetermined current value for determining the output lowering, since it is not continued the predetermined number of times, the target current accumulated value is increased depending on the input voltage. At the timing d, the target current accumulated value UP amount 2 is set because the lamp current lowering is continued the predetermined number of times.

In the period from the timings d to e, although the target current accumulated value UP amount 1 is increased depending on the power supply voltage, since the target current accumulated value UP amount 2 is greater, the target current accumulated value UP amount 1 is increased. At the timing e, the target current accumulated value UP amount 1 because of the input voltage is greater than the target current accumulated value UP amount 2. In the period from the timings e to f, the target current accumulated value is increased depending on the input voltage. At the timing f, the target current accumulated value UP amount 1 because of the input voltage is lowered because the input voltage is increased. In the period from the timings f to g, the target current accumulated value once increased is maintained without lowering.

At the timing g, the lamp current is increased also and the target current accumulated value UP amount 2 is also lowered. In the period from the timings g to h, the once increased target current accumulated value is maintained without lowering. At the timing h, although a inversion order is to be output if the target current accumulated value is not increased, since the target current accumulated value is increased, the inversion order is not output. In the period from the timing h to i, once increased target current accumulated value is maintained without lowering. At the timing i, since the current accumulated value reaches the target current accumulated value, the conversion order is output.

Embodiment 11

Figure 21:
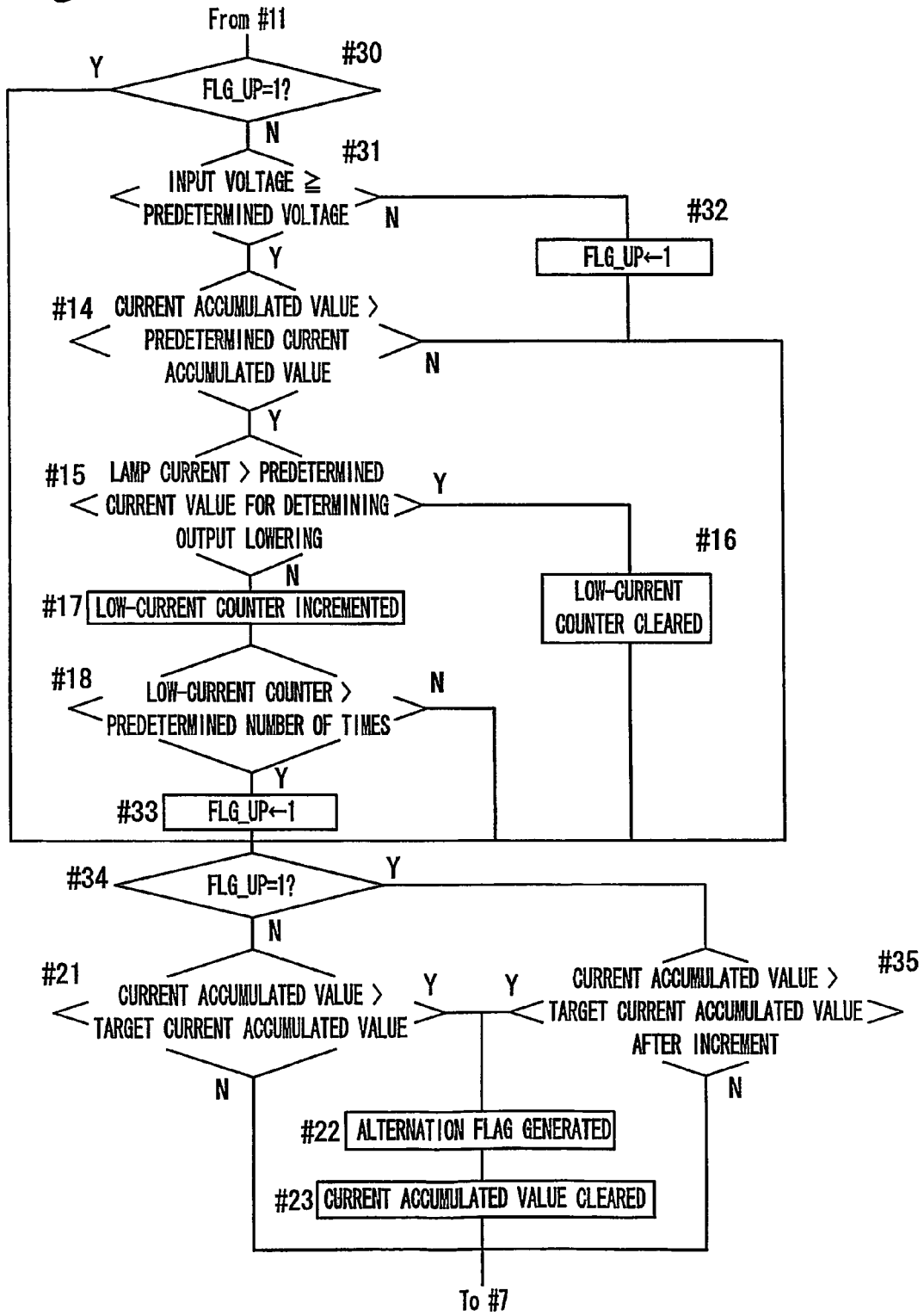
FIG. 21 is a flowchart showing main control according to an embodiment 11 of the present invention.

FIG. 21 shows a flowchart according to an embodiment 11. According to the embodiment 11, the curve which decides the target current accumulated value UP amount 1 depending on the power supply voltage in the embodiment 10 is deleted and the target current accumulated value is binarized such that it is increased or not by the predetermined input voltage. Then, it is set such that it is increased by the same amount as the target current accumulated value UP amount when the lamp current is lowered, so that the control is performed by increasing the target current accumulated value or not. In addition, once the target current accumulated value is set so as to be increased, the target current accumulated value is controlled so as to be increased after that. As described above, the control can be simplified, and once the target current accumulated value is increased, the control is performed so that the target current accumulated value is increased after that. By this arrangement, the increase of the target current accumulated value only in one direction of the discharging is prevented, and therefore only one side of the electrode is prevented from being shortened. Thus, the both sides of the electrode can be equally decreased.

FIG. 21 shows a flowchart showing an essential part of the above control. In FIG. 21, only a part which is used instead of steps #13 to #25 in FIG. 16 is shown. That is, instead of the steps #13 to #25 in which the increase amount of the target current accumulated value is varied and the alternation flag is set by comparing with the current accumulated value in the flowchart shown in FIG. 16, a flag FLG_UP is set so as to determine whether the target current accumulated value is increased or not by the facts that the input voltage is lower than the predetermined voltage and that the lamp current is lower than the predetermined current value for determining the output lowering. Then, the operation is moved to the loop in which the target current accumulated value is increased by that flag. In addition, once the flag is set, the above determination loop (steps #31 to #33) is skipped.

The flow chart will be described in detail hereinafter. When the flag FLG_UP is set at step #30, steps #31 to #33 in which it is determined whether the flag FLG_UP is set or not are skipped and the operation is moved to step #34. When the input voltage becomes smaller than the predetermined input voltage at step #31, the flag FLG_UP is set at step #32. When the current accumulated value becomes grater than the predetermined current accumulated value at step #14, and when the number of times when the lamp current becomes smaller than the predetermined current value for determining the output lowering exceeds the predetermined number of times at step #15, the flag FLG_UP is set at step #33. When the flag FLG_UP is set at step #34, the operation is moved to step #35 in which the current accumulated value is determined using the increased target current accumulated value. When the current accumulated value is more than the target current accumulated value or the increased target current accumulated value at steps #21 or #35, the alternation flag is set at step #22 and the current accumulated value is cleared at step #23.

Embodiment 12

Figure 22:
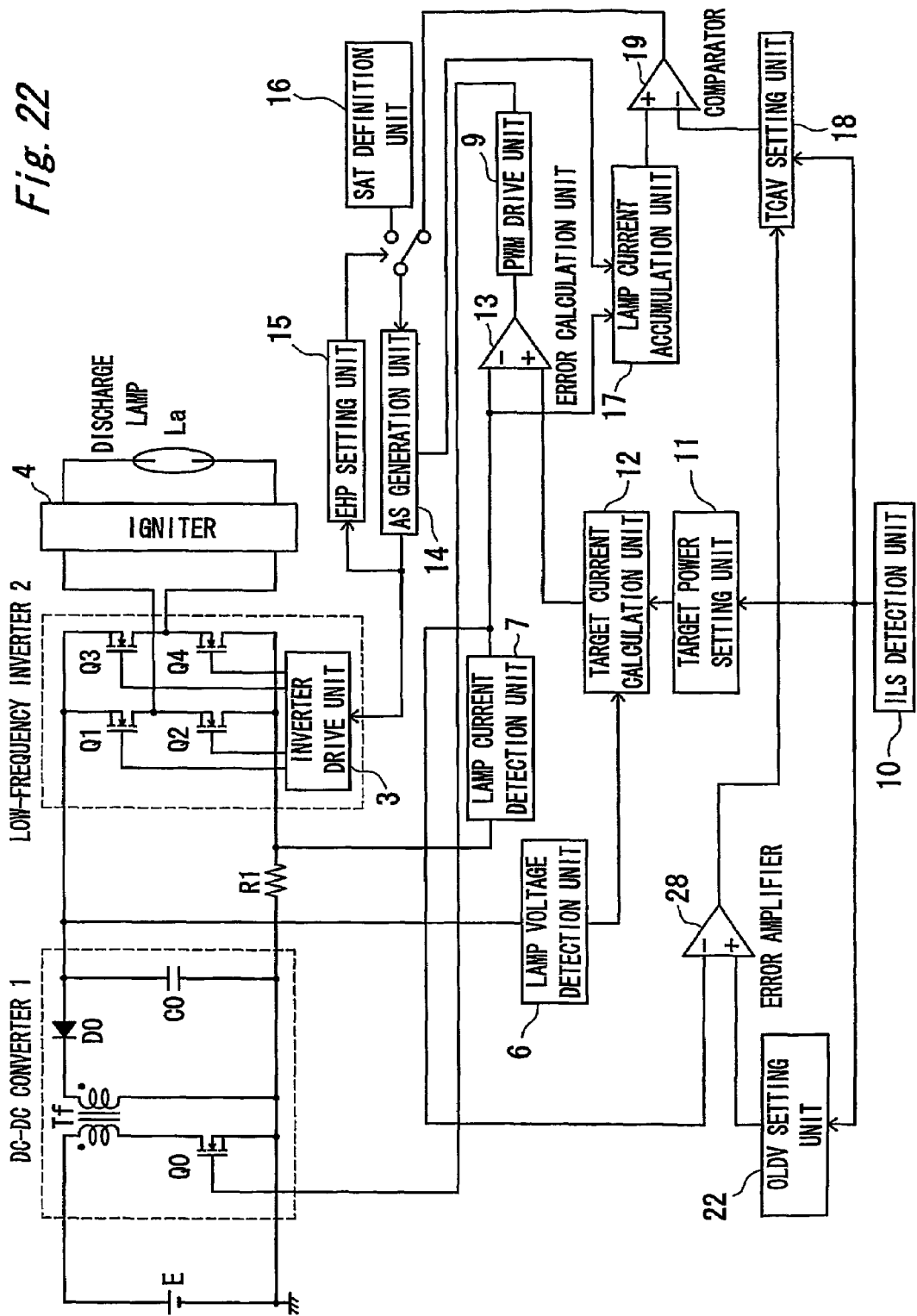
FIG. 22 is a circuit diagram according to an embodiment 12 of the present invention.

FIG. 22 is a circuit diagram showing an embodiment 12. This embodiment is different from the embodiment 4 shown in FIG. 7 merely in a point that, instead of the comparator 23 to compare the lamp current detection value with the predetermined value for determining the output lowering, an error amplifier 28 is used in FIG. 22 for detecting a difference of the value, so that a target current accumulated value (an increase amount of a current accumulated value) while the electrode is heated is determined based on the detected error difference value.

Figure 23A:
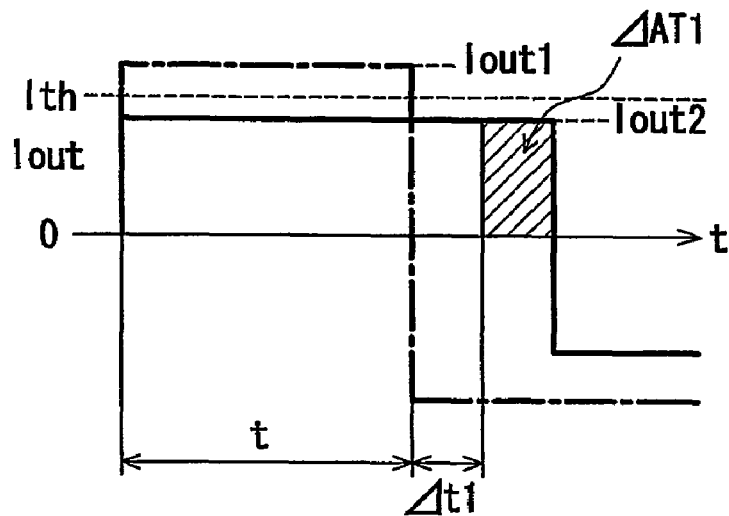
FIGS. 23A, 23B and 23C are views for explaining operations according to the embodiment 12 of the present invention.
Figure 23B:
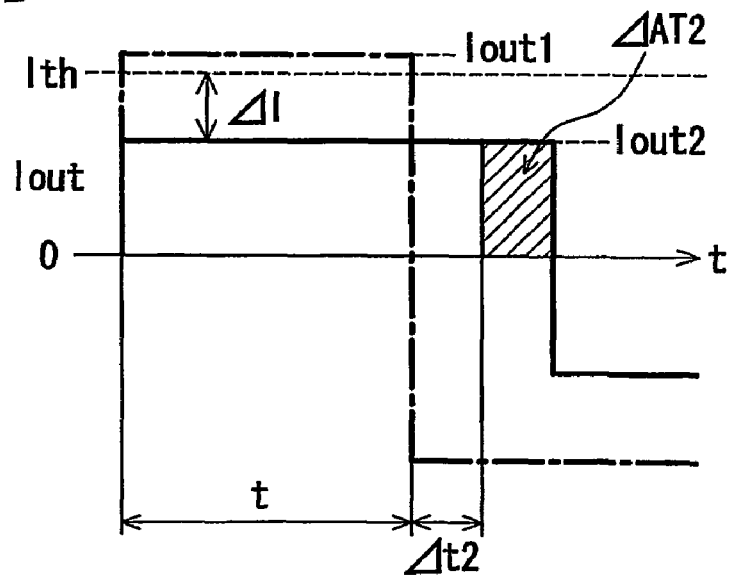

FIG. 23A shows an operation waveform when the comparator 23 is used in FIG. 7 and FIG. 23B shows an operation waveform when the error amplifier 28 is used in FIG. 22. Although each shows the waveform of a lamp current (i.e., inverter output current) Iout in a first electrode heating period (refer to FIG. 3), it may be applied to a second or later electrode heating period.

As shown in FIG. 23A, according to the embodiment 4 shown in FIG. 7, a predetermined value for determining output lowering (i.e., threshold value Ith) is provided in the lamp current Iout in the electrode heating period and when the actual lamp current Iout is not less than the threshold value Ith, the current accumulated value is increased by a predetermined value $\Delta AT1$. In FIG. 23A, it is assumed that an output current when the lamp current Iout is greater than the threshold value Ith is Iout1, and an output current when the lamp current Iout is smaller than the threshold value Ith is Iout2. In addition, in the embodiment 4 shown in FIG. 7, the threshold value Ith is defined as "a predetermined value for determining the lowering of the output current".

As shown in FIG. 23B, according to the embodiment 12 shown in FIG. 22, it is detected that the actual lamp current Iout is not less than the threshold value Ith and also a difference $\Delta I$ between the threshold value Ith and the actual lamp Iout is detected and an increase amount $\Delta AT2$ of the current accumulated value is varied by the amount $\Delta I$.

Therefore, instead of the comparator 23 for comparing the lamp current detection value and the predetermined value for determining the output lowering (Ith in this case) shown in the embodiment 4 of FIG. 7, the error amplifier 28 for detecting the difference of the values is used to determine the target current accumulated value (i.e., the increase amount of the current accumulated value) in the electrode heating period based on the detected error difference amount in this embodiment 12 shown in FIG. 22.

In FIG. 23A, it is noted here that the one-dotted broken line shows the waveform of Iout1 when Iout1≧Ith, and the current accumulated value is calculated by a formula: Iout1× t. Solid line shows the waveform of Iout2 when Iout2<Ith, and the current accumulated value is calculated by a formula: Iout2×(t+$\Delta t1$)+$\Delta AT1$. Here, $\Delta AT1$ is constant with respect to variation of Iout2, and Equation: Iout1×t=Iout2× (t+$\Delta\Delta t1$) is formulated.

In FIG. 23B, it is noted here that the one-dotted broken line shows the waveform of Iout1 when Iout1≧Ith, and the current accumulated value is calculated by a formula: Iout1× t. Solid line shows the waveform of Iout2 when Iout2<Ith, and the current accumulated value is calculated by a formula: Iout2×(t+$\Delta t2$)+$\Delta AT2$. Here, $\Delta AT2$ is variable with respect to variation of $\Delta I$, and Equation: Iout1×t=Iout2×(t+ $\Delta t2$) is formulated.

In general, it is known that, as the lamp current Iout in the electrode heating period is lower, the electrode temperature of the discharge lamp does not sufficiently rise, so that the discharge lamp is likely to go off. According to the control in the embodiment 4 in FIG. 7, the increase amount $\Delta AT1$ of the current accumulated value is constant both when the lamp Iout is slightly lower than the threshold value Ith and when it is considerably lower than the threshold value Ith. In this case, when the lamp current Iout is largely lower than the threshold value Ith, the discharge lamp may go off because of insufficiency of the increase amount of the current accumulated value.

Thus, according to the control in this embodiment 12 shown in FIG. 22, the electrode temperature of the discharge lamp can be surely increased even under the circumstances that the discharge lamp is likely to go off. As a result, the discharge lamp is prevented from going off.

Figure 23C:
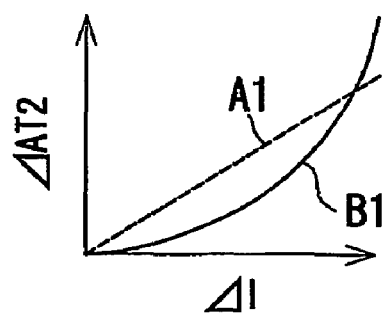

In addition, as one example, although the $\Delta AT2$ may be linearly increased according to the variation of the A1 indicative of the difference between the threshold value Ith and the actual lamp Iout as shown by a straight line A1 in FIG. 23C, when the $\Delta AT2$ is exponentially increased according to the variation of the ΔI as shown by a curved line B1 in FIG. 23C, the discharge lamp can be more surely prevented from going off.

However, as described above, if the current accumulated value is increased too much, since it could cause reduction of the life of the discharge lamp, the maximum value of the increase amount ΔAT2 of the current accumulated value is set so as not to affect on the life.

Although the control is performed by the Iout and Ith in this embodiment, the same control may be performed by replacing those with the lamp power calculated from the lamp current and the lamp voltage, together with the threshold value of the lamp power.

Embodiment 13

Figure 24:
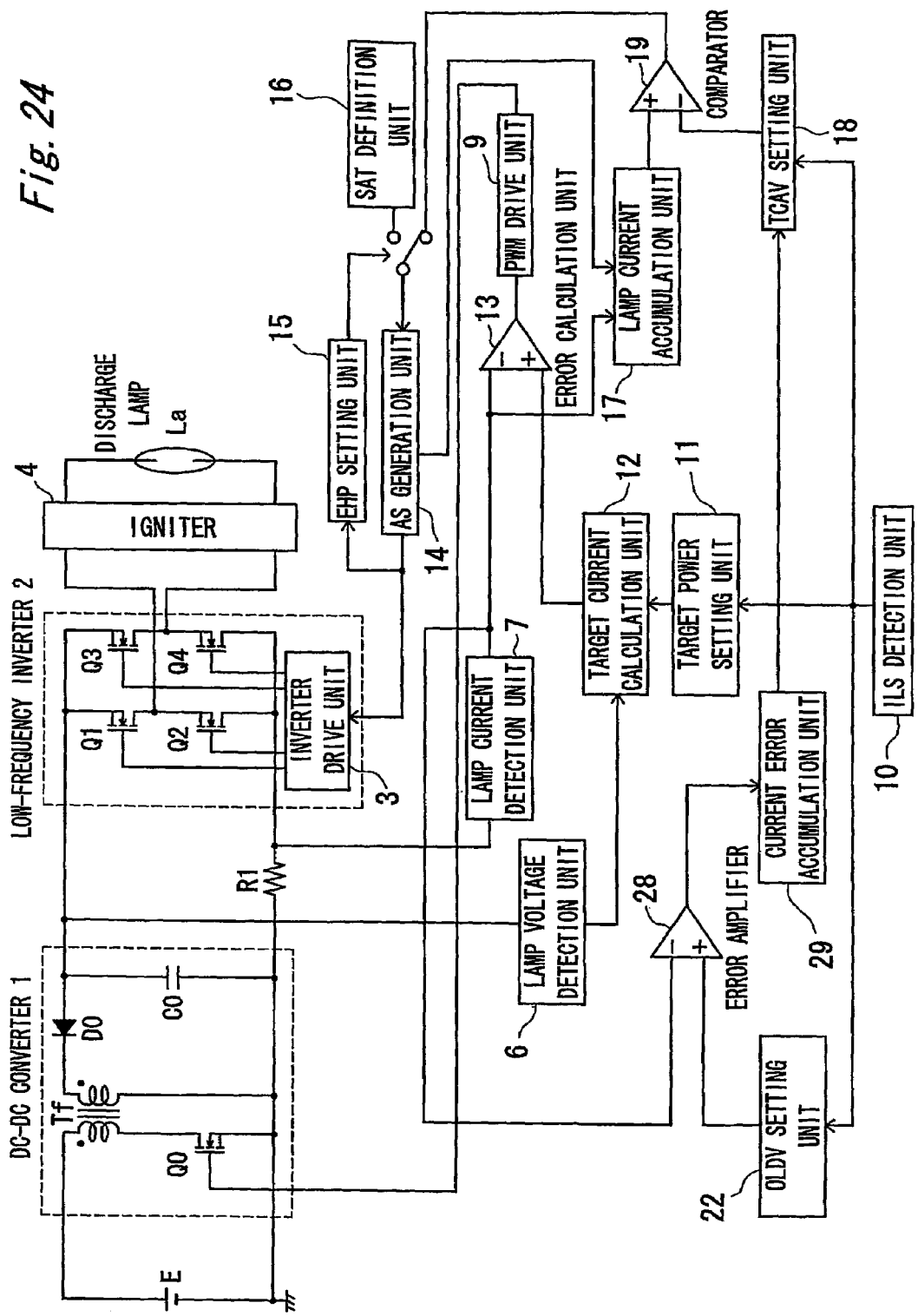
FIG. 24 is a circuit diagram according to an embodiment 13 of the present invention.
Figure 25A:
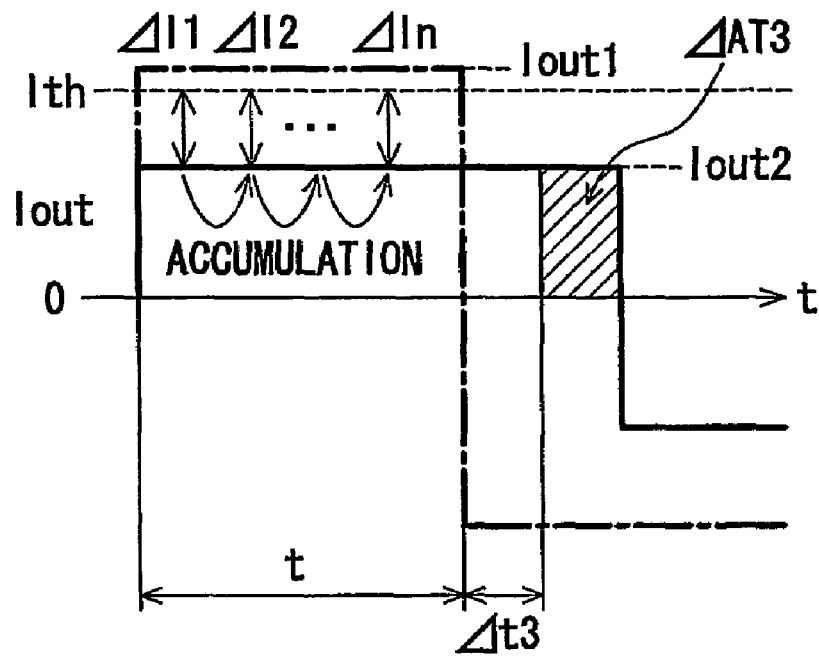
FIGS. 25A and 25B are views for explaining operations according to the embodiment 13 of the present invention.

FIG. 24 is a circuit diagram showing an embodiment 13. This embodiment is different from the embodiment 12 shown in FIG. 22 only in a point that a current error accumulation unit 29 is provided. FIG. 25A shows an operation waveform of the embodiment 13. Although the waveform shows the lamp current (i.e., inverter output current) Iout in a first electrode heating period (refer to FIG. 3), it may be applied to a second or later electrode heating period.

According to the embodiment 12, as shown in FIG. 23B, the increase amount ΔAT2 of the current accumulated value is varied based on the difference ΔI between the threshold value Ith and the actual lamp current Iout. Meanwhile, according to the embodiment 13, as show in FIG. 25A, an increase amount ΔAT3 of the current accumulated value is varied by a value $\int(\Delta In)dt$ which is provided by detecting a difference ΔIn (n=1, 2, . . . ) between the threshold value Ith and the actual lamp current Iout in each predetermined period and accumulating the differences.

Therefore, as shown in FIG. 24, the current error accumulation unit 29 is connected at an output side of an the error amplifier 28 for detecting the difference between the detection value of the lamp current Iout and the predetermined value Ith for determining the output lowering, and the target current accumulated value (i.e., the increase value ΔAT3 of the current accumulated value) in the electrode heating period is determined based on the accumulated value $\int(\Delta In)dt$ of the error.

In FIG. 25A, it is noted here that the one-dotted broken line shows the waveform of Iout1 when Iout1≧Ith, and the current accumulated value is calculated by a formula: Iout1× t. Solid line shows the waveform of Iout2 when Iout2<Ith, and the current accumulated value is calculated by a formula: Iout2×(t+Δt3)+ΔAT3. Here, ΔAT3 is variable with respect to variation of $\int(\Delta In)dt$, and Equation: Iout1× t=Iout2×(t+Δt3) is formulated.

Here, when the lamp current Iout is lower than the threshold value Ith and the difference between the threshold value Ith and the lamp current Iout is the same, as the period while Iout is lower than Ith is longer, the discharge lamp is likely to go off. Therefore, in the case the period while Iout is lower than Ith is long, it is necessary to further increase the target current accumulated value as compared with the case it is short.

The embodiment 13 implements the above. Therefore, in addition to the effect in the embodiment 12, since the increase amount of the current accumulated value can be calculated with higher precision, the discharge lamp can be surely prevented from going off while the electrical stress toward the discharge lamp is at a lower limit level.

Figure 25B:
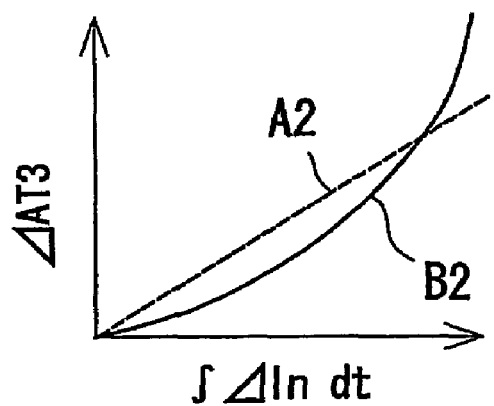

In addition, as one example, although the ΔAT3 may be linearly increased according to the variation of the $\int(\Delta In)dt$ as shown by a straight line A2 in FIG. 25B, when the ΔAT3 is exponentially increased according to the variation of the $\int(\Delta In)$ as shown by a curved line B2 in FIG. 25B, the discharge lamp can be more surely prevented from going off.

However, as described above, if the current accumulated value is increased too much, since it could cause reduction of the life of the discharge lamp, the maximum value of the increase amount ΔAT3 of the current accumulated value is set so as not to affect on the life.

Although the control is performed by the lamp current Iout and threshold value Ith in this embodiment, the same control may be performed by replacing those with the lamp power calculated from the lamp current and the lamp voltage, together with the threshold value of the lamp power.

Alternatively, in the case where the output power or the output current is lowered when the input voltage itself is lowered or the apparatus temperature rises high, in a similar manner to the embodiments 12 and 13, the electrode heating period may be adjusted depending on the lowering amount of the target output power or the output current (corresponding to the embodiment 12), or depending on the accumulated value of the lowering amount (corresponding to the embodiment 13).

Embodiment 14

Figure 26:
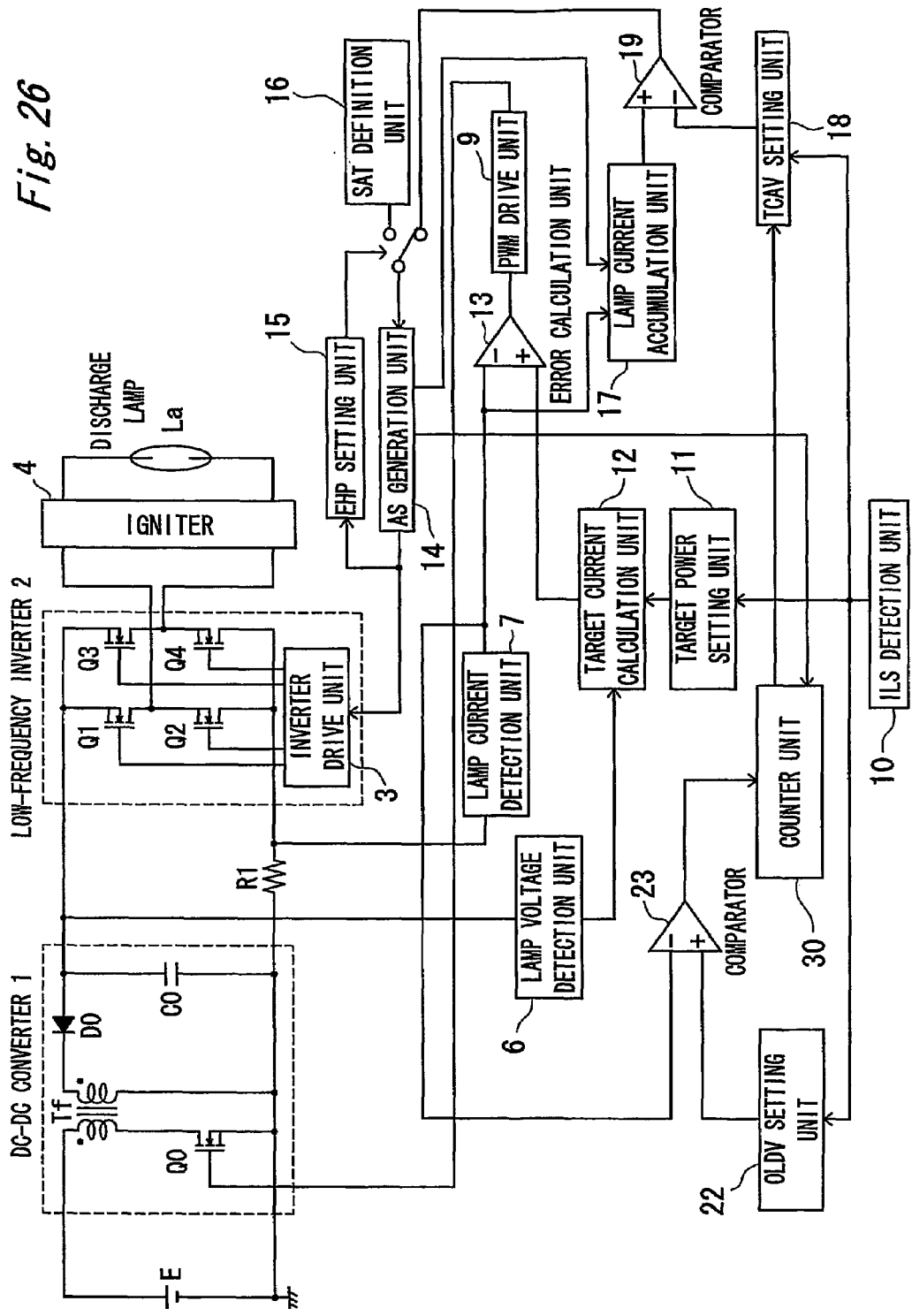
FIG. 26 is a circuit diagram according to an embodiment 14 of the present invention.
Figure 27A:
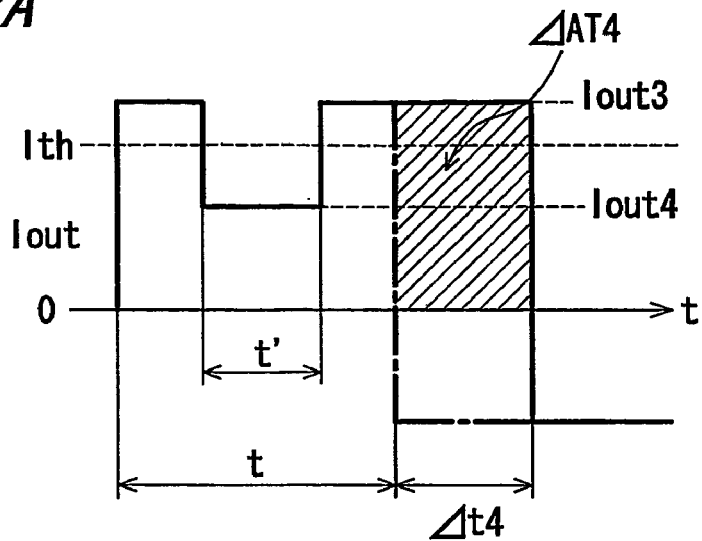
FIGS. 27A, 27B and 27C are views for explaining operations according to the embodiment 14 of the present invention.
Figure 27B:
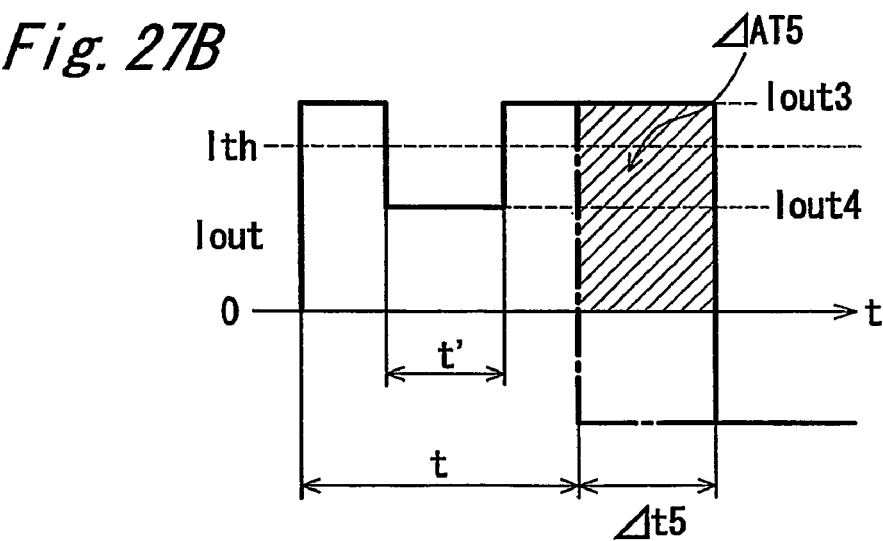

FIG. 26 is a circuit diagram showing an embodiment 14. FIGS. 27A and 27B show operation waveforms of the embodiment 7 shown in FIG. 11 and the embodiment 14 shown in FIG. 26, respectively. FIG. 27A shows only a part of a difference between the embodiment 7 of FIG. 11 and the embodiment 14 of FIG. 26. As shown in FIG. 27A, according to the embodiment 7, a current threshold value Ith is set in a lamp current Iout in an electrode heating period and when a period t' when the actual lamp current Iout is continuously lower than the current threshold value Ith exceeds a time threshold value tth, a predetermined value ΔAT4 of a current accumulated value is increased. In addition, in FIG. 27A, it is assumed that an output current is Iout3 when the lamp current Iout is greater than the current threshold value Ith, and an output current is Iout4 when the lamp current Iout is smaller than the current threshold value Ith.

Meanwhile, according to the embodiment 14 shown in FIG. 26, as shown in FIG. 27B, an increase amount ΔAT5 of a current accumulated value is varied according to a length of the period t' while the actual lamp current Iout is continuously lower than the current threshold value Ith in the electrode heating period. Therefore, a counter unit 30 is provided at an output side of a comparator 23 for counting a period while the lamp current is continuously lower than the predetermined value for determining the output lowering. The comparator 23 compares a detection value of the lamp current Iout with the predetermined value for determining the output lowering (Ith in this case). Thus, the predetermined value for determining the output lowering in the electrode heating period is determined based on the length of the counted period t' as shown in the circuit in FIG. 26. In addition, the counted value by the counter unit 30 is reset when a signal which notifies a timing of inversion by an inverter 2 is sent from an alternation signal generation unit 14 to the counter unit 30.

In FIG. 27A, it is noted here that one-dotted broken line shows the waveform of Iout when t'<tth, and the current accumulated value is calculated by a formula: Iout3×(t−t')+

Iout4×t'. Solid line shows the waveform of Iout when t'>tth, and the current accumulated value is calculated by a formula: Iout3×(t−t')+Iout4×t'+ΔAT4. Here, ΔAT4 is constant with respect to variation of t'.

In FIG. 27B, it is noted here that the current accumulated value is calculated by a formula: Iout3×(t−t')+Iout4×t'+ΔAT5. Here, ΔAT5 is variable with respect to variation of t'.

In the control of the embodiment 7 shown in FIG. 27A, the increase amount ΔAT4 of the current accumulated value is constant both when the period length t' is slightly larger than the time threshold value tth, and when it is considerably larger than the threshold value tth. In this case, when the length t' is considerably larger than the threshold value tth, the discharge lamp may go off because of insufficiency of the increase amount of the current accumulated value.

In contrast, according to the control in the embodiment 14 shown in FIG. 27B, when the length t' is considerably larger than the time threshold value tth, the current accumulated value can be more increased. As a result, the discharge lamp is surely prevented from going off.

Figure 27C:
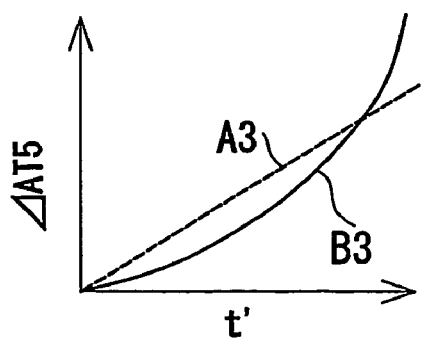

As one example, although the ΔAT5 may be linearly increased according to the variation of the time length t' as shown by a straight line A3 in FIG. 27C, when the ΔAT5 is exponentially increased according to the variation of t' as shown by a curved line B3 in FIG. 27C, the discharge lamp can be more surely prevented from going off.

However, as described above, if the current accumulated value is increased too much, since it could cause reduction of the life of the discharge lamp, the maximum value of the increase amount ΔAT5 of the current accumulated value is set so as not to affect on the life.

Although the control is performed by the lamp current Iout and the current threshold value Ith in this embodiment, the same control may be performed by replacing those with the lamp power calculated from the lamp current and the lamp voltage together with the threshold value of the lamp power.

Embodiment 15

Figure 28:
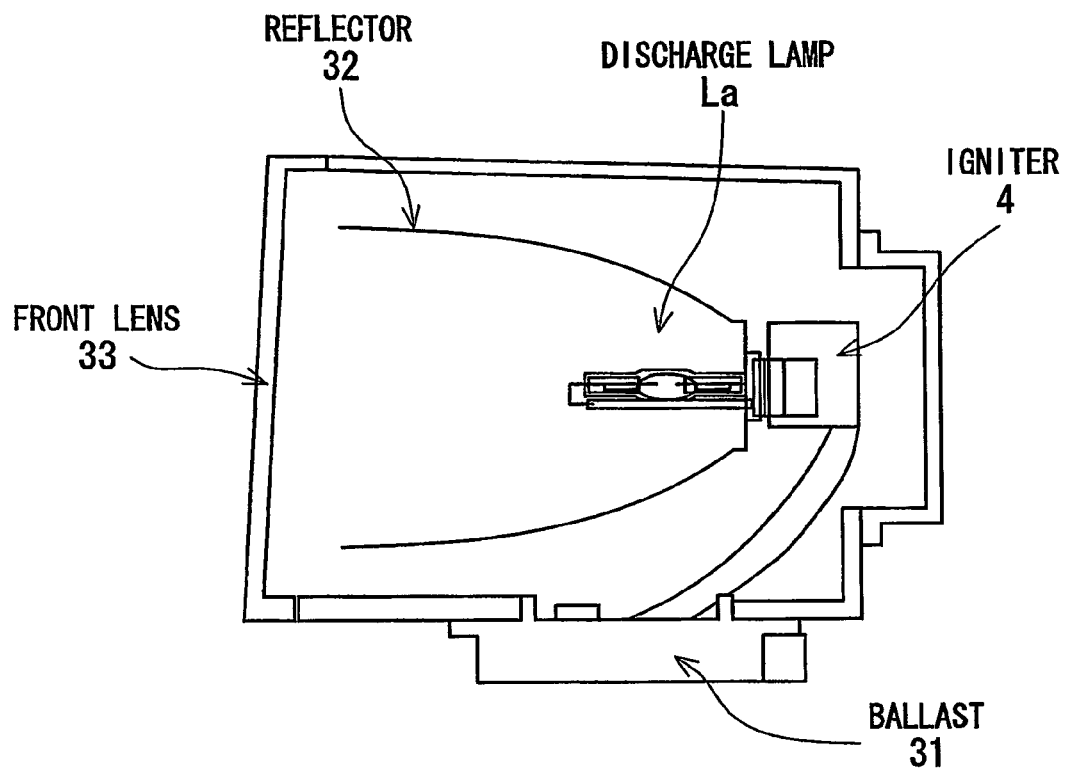
FIG. 28 is a sectional view showing a lighting apparatus according to an embodiment 15 of the present invention.

FIG. 28 is a sectional view showing an embodiment of a car headlight apparatus using a discharge lamp lighting apparatus according to the present invention. In FIG. 28, reference character La designates a discharge lamp, and reference numeral 4 designates an igniter. In addition, reference numeral 31 designates a ballast which incorporates a circuit of the lighting apparatus according to any one of the above embodiments 1 to 14.

Reference numeral 32 designates a reflector which reflects light from the discharge lamp to distribute the light, and reference numeral 33 designates a font lens.

Figure 29:
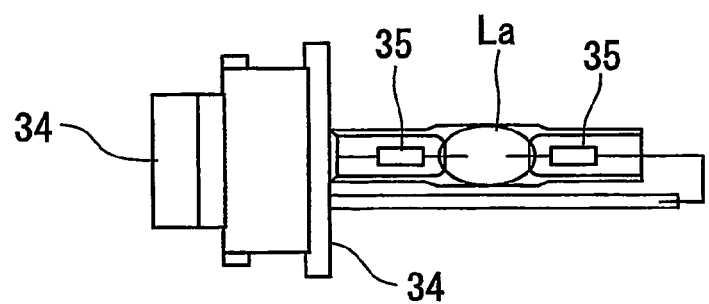
FIG. 29 is a side view showing a discharge lamp used in the lighting apparatus according to the embodiment 15 of the present invention.
Figure 31A:
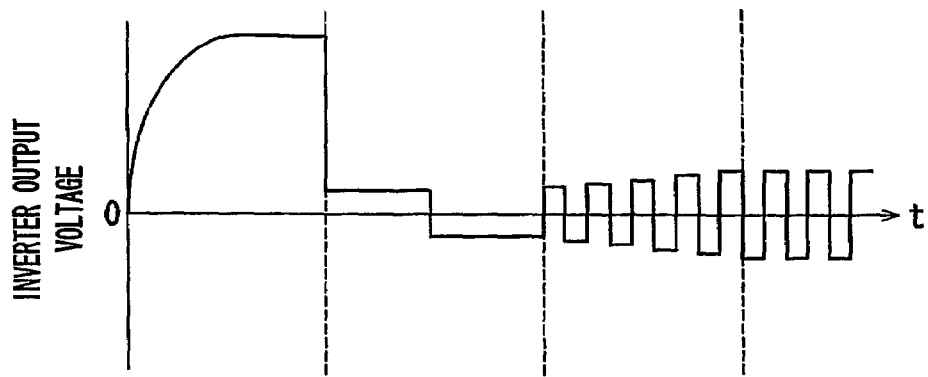
FIGS. 31A, 31B and 31C are views for explaining operations according to the conventional example.
Figure 31B:
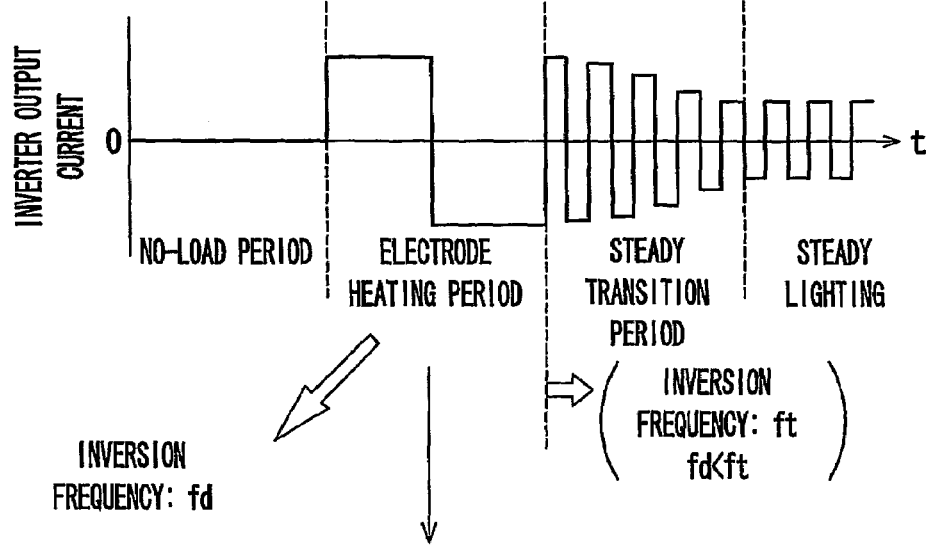
Figure 31C:
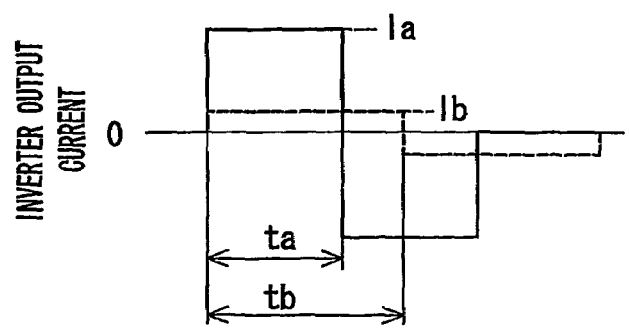

FIG. 29 is an enlarged view showing the discharge lamp La as a load. Reference numeral 34 designates a cap, and reference numeral 35 designates an electrode. The present invention especially effective when the discharge lamp which does not contain mercury is lighted, and the car headlight apparatus having the above constitution can be achieved with the effect of the present invention.

INDUSTRIAL APPLICABILITY

According to the present invention, the discharge lamp is prevented from going off when the polarity is inverted without shortening the life of the discharge lamp, so that the discharge lamp can be surely moved to the stable lighting state even when the lamp current is abruptly changed at the time of starting actuation of the discharge lamp because of the changes of the power supply circumference, the operation circumference of the lighting apparatus, or the change in electrical characteristics of the discharge lamp and the like. A lamp system such as a car headlight apparatus using the discharge lamp lighting apparatus can be provided with the same effect.

The invention claimed is:

1. A discharge lamp lighting apparatus comprising:
   a power conversion unit for converting a DC power supply voltage to a desired voltage;
   an inverter for inverting a polarity of an output of the power conversion unit and supplying an alternating output to a discharge lamp acting as a load;
   a lamp voltage detection unit for detecting a voltage value corresponding to a tube voltage of the discharge lamp;
   a lamp current detection unit for detecting a current value corresponding to a tube current of the discharge lamp; and
   a control unit for controlling an output of the inverter to be supplied to the discharge lamp depending on the detection results of the lamp voltage and lamp current detection units,
   wherein the control unit comprises electrode heating amount setting means which sets an electrode heating period such that an alternation time of the output power to be supplied to the discharge lamp is made longer than an alternation time in a steady lighting period thereof, and which determines the alternation time of the output power in the electrode heating period when an accumulated value of a lamp current with respect to a time lapse becomes a first predetermined value, and which increases the alternation time in the electrode heating period to be longer than a normal alternation time thereof, depending on a lowering degree of a lamp power or a lamp current supplied to the discharge lamp.

2. The discharge lamp lighting apparatus according to claim 1, wherein the first predetermined value of the lamp current accumulated value is variably increased depending on the lowering degree of the power or current supplied to the discharge lamp.

3. The discharge lamp lighting apparatus according to claim 1, wherein the timing of the alternation is delayed by a first predetermined time.

4. The discharge lamp lighting apparatus according to claim 1, wherein the control unit includes a power supply voltage detection unit for detecting a voltage of the DC power supply and a means for lowering a power or a current supplied to the discharge lamp depending on a lowering degree of the power supply voltage, and wherein the electrode heating amount setting means increases the alternation time in the electrode heating period depending on the lowering degree of the power supply voltage.

5. The discharge lamp lighting apparatus according to claim 4, wherein the electrode heating amount setting means increases a degree of increment of the alternation time in the electrode heating period as the power supply voltage is lower.

6. The discharge lamp lighting apparatus according to claim 1, wherein the control unit includes a temperature detection unit for detecting a temperature of the discharge lamp lighting apparatus and having a function of lowering a power or a current supplied to the discharge lamp depending on an increase of the temperature, and the electrode heating amount setting means increases the alternation time in the electrode heating period depending on the rise of the temperature.

7. The discharge lamp lighting apparatus according to claim 6, wherein the electrode heating amount setting means adjusts the degree of the increase of the alternation time so that the degree of the alternation time in the electrode heating period is made greater as the detection temperature of the discharge lamp lighting apparatus is higher.

8. The discharge lamp lighting apparatus according to claim 1, wherein the electrode heating amount setting means increases the alternation time in the electrode heating period when a value of a power or a current supplied to the discharge lamp is lower than a second predetermined value.

9. The discharge lamp lighting apparatus according to claim 8, wherein the control unit includes a lamp state detecting means for detecting an initial lamp state at the time of actuation start, and means for variably selling the second predetermined value depending on the detected initial lamp state.

10. The discharge lamp lighting apparatus according to claim 9, wherein the electrode heating amount selling means increase the alternation time in the electrode heating period depending on the output of the lamp state detecting means.

11. The discharge lamp lighting apparatus according to claim 8, wherein the electrode heating amount selling means increases a degree of increment of the alternation time in the electrode heating period as the power value or current value supplied to the discharge lamp is lowered in amount with respect to the second predetermined value of the power value or current value.

12. The discharge lamp lighting apparatus according to claim 8, wherein the electrode heating amount setting means accumulates a lowering amount of the power value or current value supplied to the discharge lamp with respect to the second predetermined value of the power value or current value, and increases a degree of increment of the alternation time in the electrode heating period as the accumulated value is greater.

13. The discharge lamp lighting apparatus according to claim 8, wherein the electrode heating amount setting means increases a degree of increment of the alternation time in the electrode heating period, as a time while a state in which the power value or the current value supplied to the discharge lamp is lower than the second predetermined value is continued is longer.

14. The discharge lamp lighting apparatus according to claim 1, wherein the electrode heating amount setting means increases the alternation time in the electrode heating period when a state in which a value of a power or a current supplied to the discharge lamp is continuously lower than a second predetermined value for a second predetermined time.

15. The discharge lamp lighting apparatus according to claim 14, wherein the control unit includes a lamp state detecting means for detecting an initial lamp state at the time of actuation start, and means for variably setting the second predetermined value depending on the detected initial lamp state.

16. The discharge lamp lighting apparatus according to claim 14, wherein the electrode heating amount setting means increases a degree of increment of the alternation time in the electrode heating period as the power value or current value supplied to the discharge lamp is lowered in amount with respect to the second predetermined value of the power value or current value.

17. The discharge lamp lighting apparatus according to claim 14, wherein the electrode heating amount setting means accumulates a lowering amount of the power value or current value supplied to the discharge lamp with respect to the second predetermined value of the power value or current value, and increases a degree of increment of the alternation time in the electrode heating period as the accumulated value is greater.

18. The discharge lamp lighting apparatus according to claim 14, wherein the electrode heating amount setting means increases a degree of increment of the alternation time in the electrode heating period, as a time while a state in which the power value or the current value supplied to the discharge lamp is lower than the second predetermined value is continued is longer.

19. The discharge lamp lighting apparatus according to claim 1, wherein the electrode heating amount setting means determines whether the alternation time is increased or not after a third predetermined time passes from the start of the discharge lamp actuation or from an alternation of an output power in the electrode heating period.

20. The discharge lamp lighting apparatus according to claim 1, wherein the electrode heating amount setting means determines whether the alternation time is increased or not after an accumulated value of a lamp current from the start of the discharge lamp or alternation of an output power with respect to a time lapse exceeds a second predetermined value in the electrode heating period.

21. The discharge lamp lighting apparatus according to claim 1, wherein the electrode heating amount setting means determines whether the alternation time is increased or not each alternation of the output power.

22. The discharge lamp lighting apparatus according to claim 1, wherein the electrode heating amount setting means makes first determination whether the alternation time is increased or not just after starting the discharge lamp actuation within the electrode heating period, and the alternation time of the inverter output in the electrode heating period thereafter is made to be the same state as that made by the first determination.

23. The discharge lamp lighting apparatus according to claim 1, wherein the discharge lamp is a metal halide lamp which does not contain mercury in an arc tube.

24. A lamp system comprising a discharge lamp lighting apparatus, wherein said discharge lamp lighting apparatus includes:
   a power conversion unit for converting a DC power supply voltage to a desired voltage;
   an inverter for inverting a polarity of an output of the power conversion unit and supplying an alternating output to a discharge lamp acting as a load;
   a lamp voltage detection unit for detecting a voltage value corresponding to a tube voltage of the discharge lamp;
   a lamp current detection unit for detecting a current value corresponding to a tube current of the discharge lamp; and
   a control unit for controlling an output of the inverter to be supplied to the discharge lamp depending on the detection results of the lamp voltage and lamp current detection units,
   wherein the control unit comprises electrode heating amount setting means which sets an electrode heating period to have an alternation time of the output power to be supplied to the discharge lamp to be made longer than an alternation time in a steady lighting period thereof, and which determines the alternation time of the output power in the electrode heating period when an accumulated value of a lamp current with respect to a time lapse becomes a first predetermined value, and which increases the alternation time in the electrode heating period to be longer than a normal alternation time thereof, depending on a lowering degree of a lamp power or a lamp current supplied to the discharge lamp.

* * * * *

UNITED STATES PATENT AND TRADEMARK OFFICE
CERTIFICATE OF CORRECTION

PATENT NO. : 7,368,881 B2 Page 1 of 1
APPLICATION NO. : 10/596794
DATED : May 6, 2008
INVENTOR(S) : Suganuma et al.

It is certified that error appears in the above-identified patent and that said Letters Patent is hereby corrected as shown below:

At column 25, line 19 (claim 19, line 2) of the printed patent, "selling" should be -- setting --.

At column 25, line 23 (claim 11, line 2) of the printed patent, "selling" should be -- setting --.

Signed and Sealed this

Sixteenth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,368,881 B2 | Page 1 of 1 |
| APPLICATION NO. | : 10/596794 | |
| DATED | : May 6, 2008 | |
| INVENTOR(S) | : Suganuma et al. | |

It is certified that error appears in the above-identified patent and that said Letters Patent is hereby corrected as shown below:

Col. 26, "claim 19, line 2" should be change to --claim 10, line 2--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,368,881 B2
APPLICATION NO. : 10/596794
DATED : May 6, 2008
INVENTOR(S) : Suganuma et al.

It is certified that error appears in the above-identified patent and that said Letters Patent is hereby corrected as shown below:

At column 25, line 19 (claim 10, line 2) of the printed patent, "selling" should be -- setting --.

At column 25, line 23 (claim 11, line 2) of the printed patent, "selling" should be -- setting --.

This certificate supersedes the Certificates of Correction issued June 16, 2009 and January 26, 2010.

Signed and Sealed this

Sixteenth Day of February, 2010

David J. Kappos
*Director of the United States Patent and Trademark Office*